(12) United States Patent
Suwa et al.

(10) Patent No.: US 10,363,860 B2
(45) Date of Patent: Jul. 30, 2019

(54) HEADLIGHT MODULE AND HEADLIGHT APPARATUS

(71) Applicant: MITSUBISHI ELECTRIC CORPORATION, Tokyo (JP)

(72) Inventors: Masashige Suwa, Tokyo (JP); Ritsuya Oshima, Tokyo (JP); Muneharu Kuwata, Tokyo (JP); Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 335 days.

(21) Appl. No.: 15/103,563

(22) PCT Filed: Dec. 8, 2014

(86) PCT No.: PCT/JP2014/082438
§ 371 (c)(1),
(2) Date: Jun. 10, 2016

(87) PCT Pub. No.: WO2015/087838
PCT Pub. Date: Jun. 18, 2015

(65) Prior Publication Data
US 2016/0312970 A1 Oct. 27, 2016

(30) Foreign Application Priority Data
Dec. 12, 2013 (JP) ................. 2013-256837

(51) Int. Cl.
*F21S 41/36* (2018.01)
*F21S 41/32* (2018.01)
(Continued)

(52) U.S. Cl.
CPC .......... *B60Q 1/0076* (2013.01); *F21S 41/143* (2018.01); *F21S 41/147* (2018.01);
(Continued)

(58) Field of Classification Search
CPC ......... F21S 41/25; F21S 41/322; F21S 41/147
See application file for complete search history.

(56) References Cited

U.S. PATENT DOCUMENTS

| 4,517,630 A | 5/1985 | Dieffenbach et al. |
| 6,724,543 B1 * | 4/2004 | Chinniah ................ F21V 5/008 359/718 |

(Continued)

FOREIGN PATENT DOCUMENTS

| CN | 101067482 A | 11/2007 |
| CN | 201057405 Y | 5/2008 |

(Continued)

*Primary Examiner* — William N Harris
(74) *Attorney, Agent, or Firm* — Birch, Stewart, Kolasch & Birch, LLP

(57) ABSTRACT

A headlight module includes a light source, a condensing optical element, and a projecting optical element. The light source emits light as projection light. The condensing optical element collects light emitted from the light source and forms an intermediate image with the collected light. A plurality of light sources is included. The projecting optical element magnifies and projects the plurality of intermediate images formed by light emitted from the plurality of light sources. The condensing optical element has a function of refracting passing light.

2 Claims, 8 Drawing Sheets

(51) Int. Cl.
  *F21S 41/365* (2018.01)
  *F21S 41/255* (2018.01)
  *F21S 41/147* (2018.01)
  *F21S 41/143* (2018.01)
  *F21S 41/20* (2018.01)
  *B60Q 1/00* (2006.01)
  *F21S 41/663* (2018.01)
  *F21Y 115/10* (2016.01)

(52) U.S. Cl.
  CPC ........... *F21S 41/285* (2018.01); *F21S 41/322* (2018.01); *F21S 41/36* (2018.01); *F21S 41/663* (2018.01); *F21S 41/255* (2018.01); *F21S 41/365* (2018.01); *F21Y 2115/10* (2016.08)

(56) References Cited

U.S. PATENT DOCUMENTS

| | | | |
|---|---|---|---|
| 7,461,960 B2* | 12/2008 | Opolka | F21L 4/00 359/728 |
| 8,029,163 B2* | 10/2011 | Chen | F21V 5/04 362/308 |
| 8,070,329 B1 | 12/2011 | Bechtel et al. | |
| 9,146,013 B2 | 9/2015 | Bauer et al. | |
| 2003/0072167 A1 | 4/2003 | Albou | |
| 2007/0114551 A1 | 5/2007 | Kawaguchi et al. | |
| 2007/0211485 A1 | 9/2007 | Godbillon | |
| 2008/0285297 A1 | 11/2008 | Ishida | |
| 2009/0073712 A1 | 3/2009 | Yamamura et al. | |
| 2009/0262546 A1 | 10/2009 | Stefanov et al. | |
| 2012/0275173 A1 | 11/2012 | Hamm et al. | |
| 2013/0322105 A1* | 12/2013 | Uchida | B60Q 1/16 362/517 |
| 2014/0016343 A1 | 1/2014 | Brendle | |
| 2014/0112012 A1 | 4/2014 | Nakazato et al. | |
| 2015/0241030 A1* | 8/2015 | Kanayama | F21S 48/1225 362/487 |

FOREIGN PATENT DOCUMENTS

| | | |
|---|---|---|
| DE | 20 2007 018 181 U1 | 6/2008 |
| DE | 10 2011 077 636 A1 | 11/2011 |
| DE | 10 2010 046 021 A1 | 3/2012 |
| DE | 10 2011 013 211 A1 | 9/2012 |
| EP | 1 818 600 A2 | 8/2007 |
| EP | 2 357 399 A1 | 8/2011 |
| JP | 58-103701 | 6/1983 |
| JP | 2003-151318 A | 5/2003 |
| JP | 2005-165224 A | 6/2005 |
| JP | 2007-142178 A | 6/2007 |
| JP | 2008-288010 A | 11/2008 |
| JP | 2009-70679 A | 4/2009 |
| JP | 2010-118274 A | 5/2010 |
| JP | 2011-171002 A | 9/2011 |
| JP | 5069985 B2 | 11/2012 |
| JP | 2012-243727 A | 12/2012 |
| WO | WO 2011/154470 A1 | 12/2011 |
| WO | WO 2012/034936 A1 | 3/2012 |
| WO | WO 2013/138834 A1 | 9/2013 |

\* cited by examiner

HEADLIGHT MODULE AND HEADLIGHT APPARATUS

TECHNICAL FIELD

The present invention relates to a headlight module and a headlight apparatus which illuminate areas ahead of vehicles.

BACKGROUND ART

During nighttime driving of a vehicle on a road, the vehicle generally switches between low beams and high beams appropriately, depending on the environment. In the nighttime driving, the vehicle illuminates the area ahead of the vehicle by using mainly low beams. Low beams illuminate the area ahead of the vehicle with a predetermined pattern of light distribution. "To illuminate" is to shine the front area with projected light. A "predetermined" means "determined in advance". The predetermined light distribution pattern is stipulated in road traffic rules and the like, for example. These road traffic rules and the like are established in each country or in each region. For example, in Japan, low beams are set to illuminate an area 40 meters ahead with such a slightly downward optical axis that oncoming vehicle and preceding vehicle are not dazzled. Low beams are used mainly in driving in city areas.

On the other hand, high beams illuminate a long range on the surface of the road. For high beams, a nearly horizontal optical axis is set with respect to the surface of the road so as to ensure the maximum front visibility during nighttime driving. In other words, the rays of high beams are thrown parallel to the surface of the road. High beams can illuminate a range up to 100 meters ahead at least. In short, high beams illuminate a wider range ahead of the vehicle with a higher illumination intensity than low beams.

Accordingly, when high beams are used, the visibility of the driver is improved. High beams, however, dazzle the driver of a vehicle running ahead of the vehicle, the driver of an oncoming vehicle, pedestrians ahead of the vehicle, and the like. Therefore, driving with high beams is permitted only when people ahead of the vehicle are not dazzled.

To solve those problems caused by driving with high beams, a technology of changing the light distribution of high beams has been proposed. In other words, a technology for solving the problem of dazzling people ahead of the vehicle has been suggested. The "light distribution" here is the luminous intensity distribution of a light source with respect to space, namely the spatial distribution of light emitted from the light source.

As a technology for changing the light distribution of high beams, patent reference 1 discloses a headlight, which will be described below. The configuration of the headlight of patent reference 1 is a projector type, including a reflector and a plurality of light source units. A lighting tool unit disclosed in patent reference 1 has a plurality of light distribution patterns in the horizontal direction. The "horizontal direction" is a direction parallel to the surface of the road.

The light source unit includes a light emitting element and a light guiding member having a rectangular front-end outgoing opening. Adjacent light guiding members have a boundary part.

The lighting tool unit controls turning on and turning off of the light source unit corresponding to an individual light distribution pattern. Accordingly, the lighting tool unit can control illumination and non-illumination of an arbitrary light distribution pattern, among a plurality of light distribution patterns. The "non-illumination" is not to throw light.

In short, the lighting tool unit can cease from illuminating a light distribution pattern in a range that can dazzle people ahead of the vehicle, out of the plurality of light distribution patterns, for example. Accordingly, the lighting tool unit can suppress the dazzling of people ahead of the vehicle and can improve the visibility of the driver.

PRIOR ART REFERENCES

Patent Reference

Patent reference 1: Japanese patent application publication No. 2009-70679

SUMMARY OF THE INVENTION

Problems to be Solved by the Invention

The headlight of patent reference 1, however, adopts the light guiding member to form a plurality of light distribution patterns. The light guiding member forms an outgoing opening of the light source unit with a reflector. The reflector always has a thickness. The light guiding member also has a thickness.

Consequently, if a plurality of light source units described in patent reference 1 is used in combination, a boundary is generated between the outgoing openings of adjacent light source units. Accordingly, when projected light illuminates an area ahead of the vehicle, this boundary casts a dark part in the light distribution pattern and generates unevenness in illumination intensity in the light distribution pattern.

To solve this problem, the headlight of patent reference 1 uses two lighting tool units as a set, so that light is projected in such a manner that the dark parts of light distribution patterns can be made up each other. This causes a problem that the configuration of the headlight becomes complicated.

The headlight of patent reference 1 also includes a light guiding member having a rectangular front-end outgoing opening. This also causes a problem that the configuration of the headlight becomes complicated.

In view of the problems of prior art, an object of the present invention is provided to form a single light distribution pattern having a clear outline by a simply-configured headlight module for projecting multiple types of light distribution patterns.

Means for Solving the Problem

A headlight module includes a light source configured to emit light as projection light; a condensing optical element configured to collect light emitted from the light source to form collected light, thereby forming an intermediate image, a plurality of the light sources being provided; and a projecting optical element configured to magnify and project a plurality of the intermediate images formed by light emitted from the plurality of light sources; wherein the condensing optical element has a function of refracting passing light.

Effects of the Invention

According to the present invention, a simply-configured headlight module for forming a single light distribution pattern with a plurality of light distribution patterns can form a single light distribution pattern having a clear outline.

MODE FOR CARRYING OUT THE INVENTION

Figure 1:
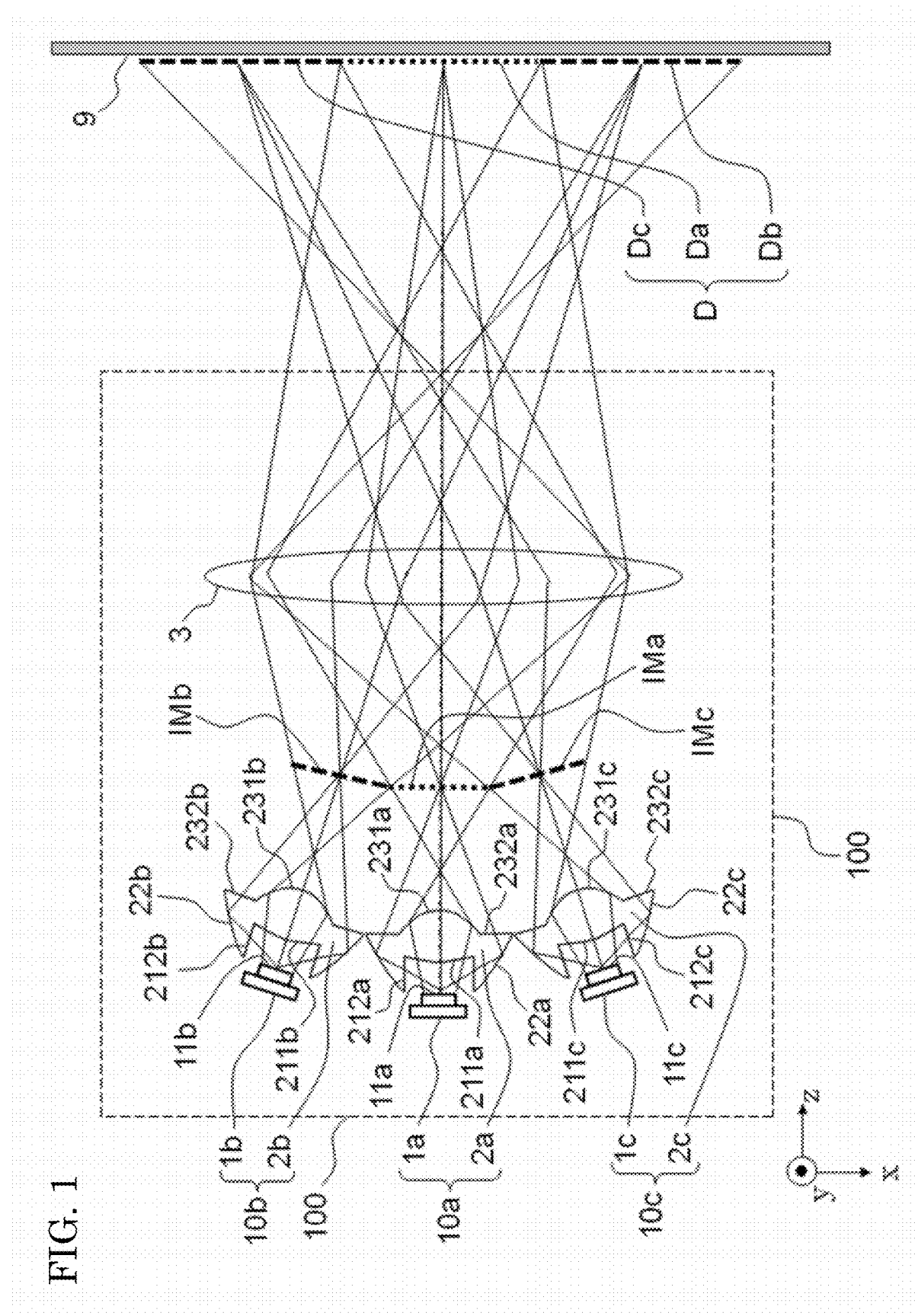
FIG. 1 is a configuration diagram showing a configuration of a headlight module 100 according to a first embodiment.

A problem of the headlight described in patent reference 1 is that the light source unit includes a light source and a reflector.

The light source here is a light emitting element such as a light emitting diode, a laser diode, or the like. The reflector (light guiding member) has a function of collecting rays from the light source. The respective light source units are arranged adjacently. Accordingly, the configuration of patent reference 1 has a complicated structure, is hard to be produced, and has a low productivity.

Each reflector has a conical shape from the outgoing opening toward the light source side. The angles of divergence of rays become large near the outgoing opening, and it is hard to direct the rays into a projector lens efficiently.

In other words, with the headlight according to the present invention, a small headlight apparatus using a solid-state light source can be provided with the decline of light utilization efficiency suppressed. The "solid-state light source" here is mainly a semiconductor light source such as a light emitting diode, a laser diode, or the like. In other words, the light source of the present invention can be a light source having directivity. The light source of the present invention can also include an organic electroluminescence light source, a light source having a flat surface on which a fluorescent material is applied to emit light when it is illuminated by excitation light, or the like.

The light source of the present invention can exclude tubular-bulb light sources which do not have directivity and require a reflector or the like, such as incandescent lamps, halogen lamps, and fluorescent lamps. This type of light source which does not include a tubular-bulb light source and has directivity is referred to as a "solid-state light source."

The headlight according to the present invention can prevent the optical system from being enlarged, and can suppress the decline of light utilization efficiency by using a light source having directivity. The headlight according to the present invention allows the projector lens to be downsized, for example. In the embodiments described below, the light source is explained as a light emitting diode (LED).

The embodiments of the present invention will be described with reference to the drawings. In the explanation of the embodiments below, the x, y, and z coordinates are used to simplify the explanation. The right-and-left direction of the vehicle is defined to be the x-axis direction. The right side relative to the front of the vehicle is defined to be the +x-axis direction, and the left side relative to the front of the vehicle is defined to be the −x-axis direction. The "front" here is a traveling direction of the vehicle. In other words, the "front" is the projecting direction of light. The up-and-down direction of the vehicle is defined to be the y-axis direction. The upper side is defined to be the +y-axis direction, and the lower side is defined to be the −y-axis direction. The "upper side" is the direction toward the sky, and the "lower side" is the direction toward the ground (road surface). The traveling direction of the vehicle is defined to be the z-axis direction. The traveling direction of the vehicle is defined to be the +z-axis direction, and the opposite direction is defined to be the −z-axis direction. The +z-axis direction is referred to as the "front," and the −z-axis direction is referred to as the "back." The +z-axis direction is the projection direction of light.

The present invention is applied to low beams and high beams of headlight apparatuses, and the like. The present invention is also applied to low beams and high beams of headlights for vehicles, and the like. The present invention is further applied to low beams and high beams of headlights for motorcycles, and the like. The present invention is further applied to low beams and high beams of headlights for motor tricycles, and the like. In short, the present invention is also applied to other headlights for three wheelers, four wheelers, or the like. In the description given below, however, an example of forming a light distribution pattern of high beams of headlights for motorcycles will be explained.

A motor tricycle is, for example, a motor three-wheeler called GYRO. The "motor three-wheeler called GYRO" is a scooter with three wheels, one wheel in the front and two wheels on a single axle in the back, and corresponds to a motor bicycle in Japan. Having a rotary shaft near the center of the vehicle, almost all parts of the vehicle body, including the front wheel and the driver's seat, can be inclined in the right-and-left direction. This mechanism allows the center of gravity to be moved inward in turning, in the same way as the motorcycle does. Therefore, the present invention is also applied to other headlights for three wheelers, four wheelers, or the like.

The "horizontal plane" is a plane parallel to the road surface. General road surfaces may be inclined with respect to the traveling direction of the vehicle. In short, it is uphill roads, downhill roads, or the like. In those cases, the "horizontal plane" is inclined toward the traveling direction of the vehicle, and is not a plane perpendicular to a direction of gravity.

On the other hand, it is rare that general roads are inclined in right-and-left direction with respect to the traveling direction of the vehicle. The "the right-and-left direction" is the direction of width of the course. The "horizontal plane" is a plane perpendicular to the direction of gravity with respect to the right-and-left direction. For example, if the road surface is inclined in the right-and-left direction, and even if the vehicle is perpendicular to the right-and-left direction with respect to the road surface, it is the same as that the vehicle is inclined with respect to the "horizontal plane" in the right-and-left direction. For ease of description given below, the "horizontal plane" is explained as a plane perpendicular to the direction of gravity.

First Embodiment

FIG. 1 is a configuration diagram showing the configuration of a headlight module 100 according to a first embodiment. FIG. 1 is a diagram seen from the upper side (+y-axis direction).

As shown in FIG. 1, the headlight module 100 according to the first embodiment includes light sources 1a, 1b, 1c, condenser lenses 2a, 2b, 2c, and a projector lens 3. The headlight module 100 in the first embodiment has three light sources 1a, 1b, 1c, as an example. The number of light sources, however, is arbitrary. The number of light sources can be two or can be greater than three.

In other words, the headlight module 100 has a plurality of light sources 1a, 1b, 1c, a plurality of condenser lenses 2a, 2b, 2c, and a single projector lens 3. The headlight module 100 includes a plurality of light source units 10 and a single projector lens 3.

"Casting" is to cast a light distribution pattern D onto an illuminated face 9. "Projection" is to throw light forming the light distribution pattern D toward the illuminated face 9.
(Light Source Unit 10)

The light source 1a and the condenser lens 2a are disposed on the optical axis of the projector lens 3. The combination of the light source 1a and the condenser lens 2a is referred to as a light source unit 10a. Light emitted from the center of the light emitting face 11a of the light source 1a at right angles to the light emitting face 11a travels on the optical axis of the condenser lens 2a. The condenser lens 2a is disposed on the side of the +z-axis direction of the light source 1a. The projector lens 3 is disposed on the side of the +z-axis direction of the condenser lens 2a.

The optical axes of the light source 1b and the condenser lens 2b are on a plane which includes the optical axis of the projector lens 3 and is parallel to the z-x plane. The combination of the light source 1b and the condenser lens 2b is referred to as a light source unit 10b. Light emitted from the center of the light emitting face 11b of the light source 1b at right angles to the light emitting face 11b travels on the optical axis of the condenser lens 2b.

The optical axes of the light source 1b and the condenser lens 2b are inclined with respect to the optical axis of the projector lens 3. The optical axes of the light source 1b and the condenser lens 2b cross the optical axis of the projector lens 3 on the side of the light traveling direction with respect to the condenser lens 2b. In other words, light emitted from the center of the light emitting face 11b of the light source 1 passes through the condenser lens 2b and then reaches the optical axis of the projector lens 3.

The condenser lens 2b is disposed on the side of the +z-axis direction of the light source 1b. The projector lens 3 is disposed on the side of the +z-axis direction of the condenser lens 2b. The light source 1b and the condenser lens 2b are disposed in the −x-axis direction with respect to the optical axis of the projector lens 3.

The optical axes of the light source 1c and the condenser lens 2c are on a plane which includes the optical axis of the projector lens 3 and is parallel to the z-x plane. The combination of the light source 1c and the condenser lens 2c is referred to as a light source unit 10c. Light emitted from the center of the light emitting face 11c of the light source 1c at right angles to the light emitting face 11c travels on the optical axis of the condenser lens 2c.

The optical axes of the light source 1c and the condenser lens 2c are inclined with respect to the optical axis of the projector lens 3. The optical axes of the light source 1c and the condenser lens 2c cross the optical axis of the projector lens 3 on the side of light traveling direction with respect to the condenser lens 2c. In other words, light emitted from the center of the light emitting face 11c of the light source 1c passes through the condenser lens 2c and then reaches the optical axis of the projector lens 3.

The condenser lens 2c is disposed on the side of the +z-axis direction of the light source 1c. The projector lens 3 is disposed on the side of the +z-axis direction of the condenser lens 2c. A light source 1cb and a condenser lens 2cb are disposed in the +x-axis direction with respect to the optical axis of the projector lens 3.

The condenser lenses 2a, 2b, 2c are disposed immediately after the light sources 1a, 1b, 1c. "After" here means on the side of the traveling direction of light emitted from the light sources 1a, 1b, 1c. In the embodiments below, the light traveling direction is defined to be the +z-axis direction. Since they are "immediately after" here, light emitted from the light emitting faces 11a, 11b, 11c immediately enters the condenser lenses 2a, 2b, 2c.

A light emitting diode (LED) emits light showing Lambert's light distribution. "Lambert's light distribution" is a light distribution in which the brightness of the light emitting face is constant irrespective of the viewing directions. In other words, the light distribution of the light emitting diode has a wide directivity. Consequently, by reducing the distance between the light source 1 and the condenser lens 2, a larger amount of light can be directed into the condenser lens 2.

In the first embodiment, the light source units 10b, 10c are disposed with an inclination relative to the optical axis of the projector lens 3. This is carried out for downsizing the headlight module 100. Accordingly, the light source units 10a, 10b, 10c can also be disposed in such a manner that their optical axes become parallel to the optical axis of the projector lens 3. In that case, however, a sufficient dimension needs to be secured in the z-axis direction, and a large projector lens 3 needs to be used. In that case, however, intermediate images IMa, IMb, IMc can be placed on a plane perpendicular to the optical axis of the projector lens 3, with a small number of optical components. In short, the intermediate images IMa, IMb, IMc are formed on a single plane.

By forming intermediate images IMb, IMc perpendicular to the optical axis of the projector lens 3, the outline of the light distribution pattern can be prevented from becoming unclear in the periphery, as will be described in a second embodiment.
(Light Source 1)

The light sources 1a, 1b, 1c respectively have light emitting faces 11a, 11b, 11c. Each of the light sources 1a, 1b, 1c emit light for illuminating an area ahead of the vehicle, from the light emitting faces 11a, 11b, 11c. The light for illuminating the area ahead of the vehicle is referred to as "projected light."

Generally, the light emitting faces 11a, 11b, 11c are rectangular shapes. The light emitting faces 11 of light emitting diodes that are distributed in the market have set shapes with 3:4 or other aspect ratios, for example. Accordingly, a light distribution pattern for a specific application needs to be formed by the headlight.

As the light sources 1a, 1b, 1c, light emitting diodes, electroluminescence elements, laser diodes, or the like can be used. In the description below, however, the light source 1 is described as a light emitting diode (hereafter referred to as LED).

Reference character 1 for the light source will also be used when the light source 1a, the light source 1b, and the light source 1c are described together. When the condenser lens 2a, the condenser lens 2b, and the condenser lens 2c are described together, they are expressed as a condenser lens 2. When the light source unit 10a, the light source unit 10b, and the light source unit 10c are described together, they are expressed as a light source unit 10.

(Condenser Lens 2)

The condenser lenses 2a, 2b, 2c are lenses having positive power. The condenser lenses 2a, 2b, 2c have a function as a condensing optical element. In other words, the condenser lenses 2a, 2b, 2c are examples of condensing optical elements. The condenser lenses 2a, 2b, 2c are also examples of condensing optical elements having a refraction function (refraction type condensing optical elements). The power is also called "refractive power."

In the first embodiment, each of the condenser lenses 2a, 2b, 2c have the same shape and the same function, for example. Accordingly, the condenser lens 2a will here be explained with reference to FIG. 2. However, by varying the shapes of the condenser lenses 2a, 2b, and 2c with each other as described above, the shapes of the intermediate images IMa, IMb, IMc can also be varied.

The condenser lenses 2a, 2b, 2c are made of transparent resin, glass, or a silicone material, for example. If the material of the condenser lenses 2a, 2b, 2c has transparency, the material does not matter; transparent resin or the like can be used. However, in terms of light utilization efficiency, a highly transparent material is suitable as the material of the condenser lens 2a. Since the condenser lenses 2a, 2b, 2c are disposed immediately after the light sources 1, 1b, 1c, a material with excellent heat resistance is preferred as the material of the condenser lenses 2a, 2b, 2c.

Figure 2:
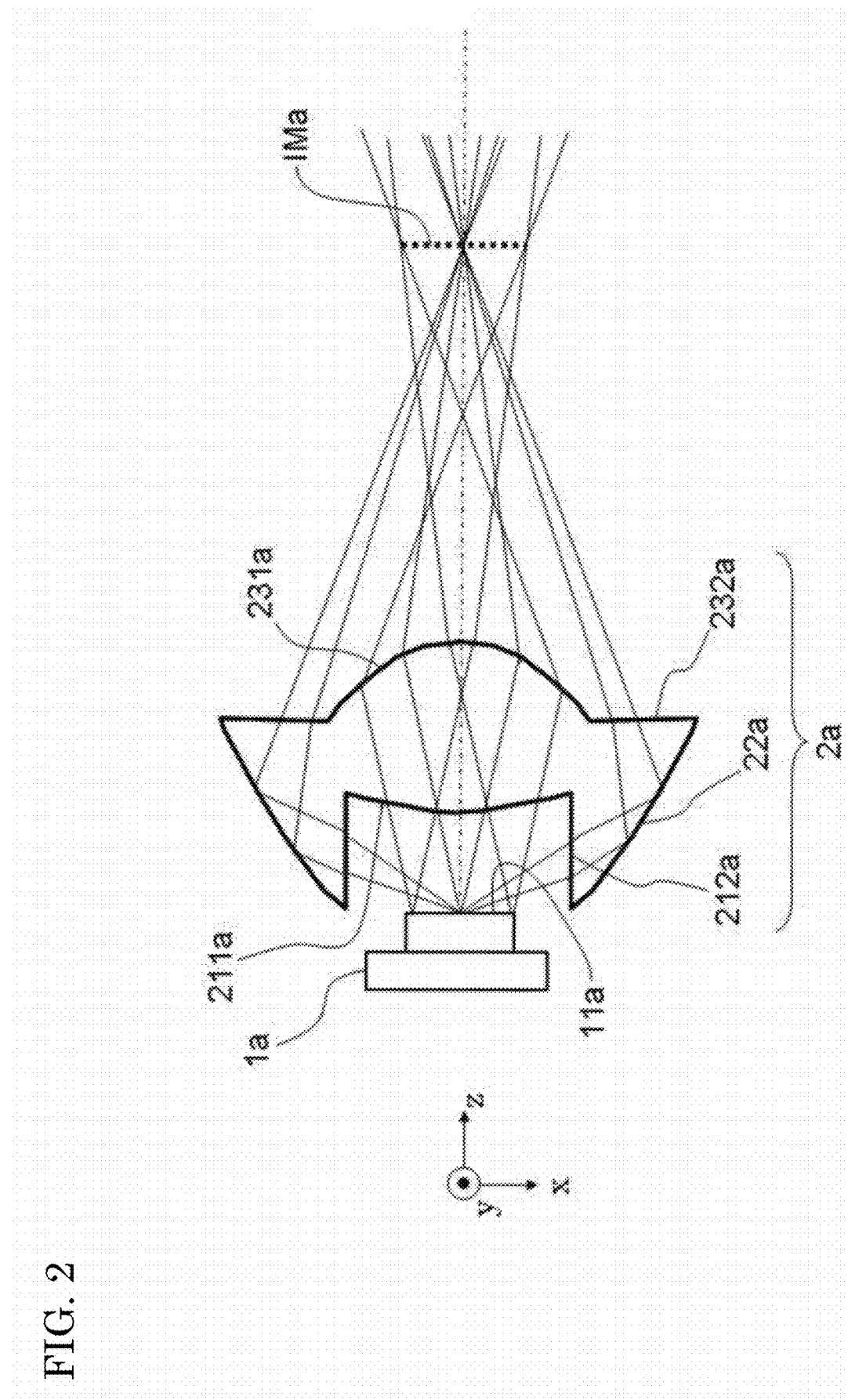
FIG. 2 is a diagram showing a relationship among a light source 1a, a condenser lens 2a, and an intermediate image IMa of the headlight module 100 according to the first embodiment in more detail.

FIG. 2 is a diagram showing the relationship among the light source 1a, the condenser lens 2a, and the intermediate image IMa in more detail. The condenser lens 2a has incident faces 211a, 212a, a reflection face 22a, and output faces 231a, 232a. As shown in FIG. 1, the condenser lens 2b has incident faces 211b, 212b, a reflection face 22b, and output faces 231b, 232b. As shown in FIG. 1, the condenser lens 2c has incident faces 211c, 212c, a reflection face 22c, and output faces 231c, 232c.

The incident face 211a is an incident face formed in the central part of the condenser lens 2a. The "central part of the condenser lens 2" means that the optical axis of the condenser lens 2a has a point of intersection on the incident face 211a.

The incident face 211a has a rotationally symmetrical shape around the optical axis, for example. The incident face 211a has a convex shape with positive power.

The incident face 212a has a surface profile of a body of revolution obtained by revolving an ellipse around its long axis or short axis, for example. The body of revolution obtained by revolving an ellipse around its long axis or short axis is referred to as an "ellipsoid of revolution". The optical axis of the condenser lens 2a agrees with the axis of rotation of the ellipsoid of revolution. The incident face 212a has a surface profile obtained by cutting the ellipsoid of revolution at both ends in the direction of the axis of rotation. In short, the incident face 212a has a tubular shape.

An end of the front side (end on the side of the +z-axis direction) of the tubular shape of the incident face 212a is connected to the rim of the incident face 211a. The end of the front side (end on the side of the +z-axis direction) of the tubular shape of the incident face 212a is placed on the outer periphery side of the incident face 211a. The tubular shape of the incident face 212a is formed on the side of the −z-axis direction (back side) with respect to the incident face 211a.

The reflection face 22a has a tubular shape. The cross-sectional shape of the reflection face 22a in the x-y plane has a circular shape around the optical axis, for example.

In the tubular shape of the reflection face 22a, the diameter of the circular shape in the x-y plane at the end on the side of the −z-axis direction is smaller than the diameter of the circular shape in the x-y plane at the end on the side of the +z-axis direction. In short, the diameter of the reflection face 22a increases from the −z-axis direction to the +z-axis direction.

The reflection face 22a has a shape of the side of a truncated cone, for example. The shape of the side of a truncated cone has a linear profile in a plane including the central axis. The shape of the reflection face 22a in a plane including the optical axis, however, can be a curved shape.

An end of the back side (end on the side of the −z-axis direction) of the tubular shape of the reflection face 22a is connected to the other end (end on the side of the −z-axis direction) of the tubular shape of the incident face 212a. An end of the back side (end on the side of the −z-axis direction) of the tubular shape of the reflection face 22a is placed in the part of the other end (end on the side of the −z-axis direction) of the tubular shape of the incident face 212a. In short, the reflection face 22a is placed on the outer periphery side of the incident face 212a.

The output face 231a is placed on the side of the +z-axis direction of the incident face 211a. The incident face 231a is the output face formed in the central part of the condenser lens 2a. The "central part of the condenser lens 2" means that the optical axis of the condenser lens 2a has a point of intersection on the output face 231a.

The output face 231a has a convex shape with positive power. The output face 231a has a rotationally symmetrical shape around the optical axis, as the rotation axis, for example.

The output face 232a is placed on the outer periphery side of the output face 231a. The inner periphery and the outer periphery of the output face 232a are circular shaped.

In FIG. 2, the output face 232a has a planar shape parallel to the x-y plane. The output face 232a, however, can also have a curved shape.

The inner periphery of the output face 232a is connected to the outer periphery of the output face 231a. The inner periphery of the output face 232a is placed on the side of the outer periphery of the output face 231a. The outer periphery of the output face 232a is connected to the other end (end on the side of the +z-axis direction) of the tubular shape of the reflection face 22a. The outer periphery of the output face 232a is placed in the part of the other end (end on the side of the +z-axis direction) of the tubular shape of the reflection face 22a.

The condenser lenses 2a, 2b, 2c can be formed integrally with the light sources 1a, 1b, 1c. It is the light source that is an LED equipped with a lens, for example.

(Intermediate Image IM)

Among light output from the light emitting face 11a, rays of small outgoing angles enter the incident face 211a. The rays of small outgoing angles have a divergence angle within 60 degrees, for example. The rays of small outgoing angles are input from the incident face 211a and output from the output face 231a.

The rays of small outgoing angles, output from the output face 231a are collected in the front (+z-axis direction) of the condenser lens 2a. In short, the rays of small outgoing angles are collected by the condenser lens 2a. The rays of small outgoing angles are collected onto the position indicated by the dashed lines in FIGS. 1 and 2.

At this point, the intermediate image IMa of the light emitting face 11a is formed in the position indicated by the dashed lines in FIGS. 1 and 2. The intermediate image IMa is placed in front of the condenser lens 2a. Accordingly, the intermediate image IMa and the light emitting face 11a are in an optically conjugate relationship. Being "optically conjugate" means a relationship that a ray emitted from a single point forms another point of image.

The light emitting face 11a has a square shape, for example. Therefore, the intermediate image IMa in a conjugate relationship with the light emitting face 11a also has a square shape.

The intermediate image IMa is an intermediate image having a clear square-shaped outline because the intermediate image IMa is in an optically conjugate relationship with the light emitting face 11a. The clear outline of the intermediate image IMa corresponds to the light emitting face 11a.

Letting the length in the horizontal direction (x-axis direction) of the light emitting face 11a be xa and the length in the horizontal direction (x-axis direction) of the intermediate image IMa be IMxa, the magnification (lateral magnification) m of the condenser lens 2a can be given by the following expression (1).

$$m = IMxa/xa \quad (1)$$

At this point, if the magnification m of the intermediate image IMa is too large, the size of the headlight module 100 becomes large. Therefore, a preferable size of the intermediate image IMa is equivalent to the size of the light emitting face 11a. The magnification m is preferred to be up to 10 at the most.

Among light output from the light emitting face 11a, rays of large outgoing angles enter the incident face 212a. The rays of large outgoing angles have a divergence angle greater than 60 degrees, for example. The rays input from the incident face 212a are reflected by the reflection face 22a and travel in the +z-axis direction. The rays reflected by the reflection face 22a are output from the output face 232a.

The rays of large outgoing angles, output from the output face 232a are collected by the condenser lens 2a.

The rays of large outgoing angles are collected onto the position where the intermediate image IMa is generated, in front (+z-axis direction) of the condenser lens 2a. At this point, the position on the x-y plane where the pencil of rays output from the output face 232a is collected needs to be within the range of the intermediated image IMa.

The "intermediate image IMa" here is an intermediate image formed by rays of small outgoing angles. As described earlier, the outline of the intermediate image IMa corresponds to the light emitting face 11a. Since the light emitting face 11a here is square shaped, the intermediate image IMa is also square shaped, for example.

The x-y plane is a plane perpendicular to the optical axis of the condenser lens 2a. The "size of the pencil of rays in the light collecting position on the x-y plane" will be referred to hereafter as a "light collection size."

The intermediate image IMa and the light emitting face 11a are in an optically conjugate relationship. The intermediate image IMa has a clear outline. If the size of the pencil of rays output from the output face 232a becomes larger than the size of the intermediate image IMa, the clear outline will be lost. In other words, the clear outline of the light emitting face 11a will not appear in the position of the intermediate image IMa.

The rays reflected by the reflection face 22a of the condenser lens 2a do not form an image similar in shape to the light emitting face 11a on the intermediate image IMa. The rays reflected by the reflection face 22a of the condenser lens 2a form a circular-shaped image on the intermediate image IMa. Therefore, in the first embodiment, the rays of large outgoing angles form a circular-shaped image inscribed in the intermediate image IMa formed by the rays of small outgoing angles. In short, the rays of large outgoing angles form an image smaller than the intermediate image IMa.

The light collecting position in the optical axis direction of the rays output from the output face 232a does not always need to agree with the position in the optical axis direction of the intermediate image IMa. Just the light collection size of the rays output from the output face 232a need to be smaller than the size of the intermediate image IMa.

The light collecting position in the optical axis direction of the rays output from the output face 232a can be a position closer to the condenser lens 2a than the position in the optical axis direction of the intermediate image IMa, for example. This makes it possible to secure the clear outline of the intermediate image IMa.

In patent reference 1, for example, a reflector is used to collect rays emitted from the light source. Since the reflector in patent reference 1 is not an image-forming optical system, an image having the shape of the light emitting face of the light source is not formed in the light collecting position of the rays output from the light source. Therefore, the light collecting spot of the light collecting position does not have the shape of the light emitting face of the light source and does not consequently have a clear outline.

In consequence, the light distribution pattern itself does not have a clear outline as well. Even in the case where the pattern is formed by turning on or off an individual light source, each of the light distribution does not have a clear outline either.

The light source unit in patent reference 1 has a light emitting element and a light guiding member having a rectangular shaped front-end outgoing opening. In other words, adjacent light guiding members have a boundary part. The front-end outgoing opening of the light guiding member is disposed on the back-side focal plane of the projector lens. The boundary part causes the clear outline to be formed. These light distribution patterns have clear outlines.

In patent reference 1, those different shapes are formed by providing the front-end outgoing openings varying in rectangular shape. These light distribution patterns have different shapes. In short, in patent reference 1, light distribution patterns of different shapes are formed by the boundary parts.

The above indicates that in the case where rays output from the light source are collected just by using a reflector, which is a non-image-forming optical system, intermediate images IM, IMa, IMb, IMc having clear outlines corresponding to the shape of the light emitting face cannot be implemented. It is also indicated that light distribution patterns D, Da, Db, Dc having clear outlines cannot be implemented.

To implement light distribution patterns D, Da, Db, Dc having clear outlines, a light guiding member having the front-end outgoing opening in patent reference 1 or the like would be required.

If an intermediate image is formed just by using a reflector, which is an image-forming optical system, it would be hard for the reflector alone to form an intermediate image having a shape corresponding to the shape of the light emitting face.

One reason is that the elliptical mirror that is commonly used in headlights for vehicles has a drawback that as the light source increases in size, astigmatism increases. Further, because the light source has a large divergence angle, it is hard for a small light source to form an intermediate image having the shape of the light emitting face efficiently.

The "headlights for vehicles" are headlights to be provided on vehicles, namely headlights to be used on vehicles.

Accordingly, in the case where light is collected by an elliptical mirror, it is also hard to form a light distribution pattern having a clear outline. Thus, a shade that form a light distribution pattern in the light collecting position should be arranged and light should be blocked.

This method of forming the light distribution pattern is commonly used to form brightness and darkness dividing lines (cut-off lines) in low beams by the current headlights for vehicles. It is clear that this type of light distribution formation method blocks light and consequently deteriorates light utilization efficiency.

As described above, in the case where an intermediate image is formed by using a reflector, which is an image-forming optical system, a light blocking plate (a shade) that forms a light distribution pattern needs to be used to make light distribution patterns D, Da, Db, Dc having clear outlines.

The headlight module 100 according to the first embodiment makes it possible to form an intermediate image having a clear outline with a simple configuration, by replacing the reflector with the condenser lenses 2a, 2b, 2c having a function of refracting passing light. In other words, the headlight module 100 can form intermediate images IM, IMa, IMb, IMc with clear outlines and light distribution patterns D, Da, Db, Dc with clear outlines without using a light guiding member having a front-end outgoing opening and a light blocking plate (a shade).

In the first embodiment, the incident faces 211a, 212a, the reflection face 22a, and the output faces 231a, 232a of the condenser lens 2a each have rotationally symmetrical shapes around the optical axis. However, if an intermediate image IM having the clear outline of the light emitting face 11a of the light source 1a can be formed, the incident faces 211a, 212a, the reflection face 22a, and the output faces 231a, 232a do not always need to have rotationally symmetrical shapes. Especially, in the case where the shape of light emitting 11a of the light source 1a is rectangular shape (oblong shape), by making the cross-sectional shape of the reflection face 22a in the x-y plane to be elliptical shaped, it is possible to downsize the condenser lens 2a.

As shown in FIG. 1, each of the intermediate images IMa, IMb, IMc formed by the condenser lenses 2a, 2b, 2c are in contact with one another on horizontal direction (x-axis direction) boundary. Alternatively, each of the intermediate images IMa, IMb, IMc can be disposed to overlap in part one another on horizontal direction (x-axis direction) boundary. This disposition allows the intermediate images IMa, IMb, IMc to be disposed continuously.

In short, the intermediate images IMa, IMb, IMc form a single intermediate image IM. Thus, the plurality of intermediate images IMa, IMb, IMc form a single intermediate image IM having a bright part. The "bright part" here indicates a part in which the intermediate image IM is formed by illuminating light. The plurality of intermediate images IMa, IMb, IMc form the single intermediate image IM generated by connecting parts corresponding to the edges of the light emitting faces 11a, 11b, 11c.

The intermediate images IMa, IMb, IMc at this point form light distribution patterns Da, Db, Dc on the illuminated face 9 of the headlight module 100. A light distribution pattern D is a light distribution pattern formed by combining the light distribution patterns Da, Db, Dc. The plurality of light distribution patterns Da, Db, Dc form a single light distribution pattern D having a bright part. In short, the intermediate image IM forms the light distribution pattern D on the illuminated face 9 of the headlight module 100.

The intermediate image IM of the light distribution pattern formed by arranging the intermediate images IMa, IMb, IMc in the horizontal direction (x-axis direction) is magnified and cast by the projector lens 4 on the illuminated face 9 ahead of the vehicle.

The illuminated face 9 here is a virtual face set in a predetermined position ahead of the vehicle. The predetermined position ahead of the vehicle is the position where illumination intensity or luminous intensity of the headlight apparatus is measured and is stipulated in the Road Traffic Law or the like. In Europe, for example, the luminous intensity measurement position of headlight apparatuses for vehicles stipulated by UNECE (United Nations Economic Commission for Europe) is a position 25 meters apart from the light source. In Japan, the luminous intensity measurement position stipulated by the Japanese Industrial Standards Committee (JIS) is a position 10 meters apart from the light source.

In FIG. 1, the edge of the intermediate image IMa on the side of the −x-axis direction is connected to the edge of the intermediate image IMb on the side of the +x-axis direction. The edge of the intermediate image IMa on the side of the +x-axis direction is connected to the edge of the intermediate image IMc on the side of the −x-axis direction.

However, it can be configured that the edge of the intermediate image IMb on the side of the +x-axis direction be connected to the edge of the intermediate image IMc on the side of the −x-axis direction. In that case, the intermediate image IMb and the intermediate image IMc form a shape of the light distribution pattern D. The intermediate image IMa is formed by overlapping the intermediate image IMb and the intermediate image IMc. The light distribution pattern Da forms a high-illumination-intensity region of the light distribution pattern D.

(Projector Lens 3)

The projector lens 3 is a lens having positive power. The projector lens 3 is a lens made of transparent resin or the like. The projector lens 3 has a function as a projecting optical element. In other words, the projector lens 3 is one example of the projecting optical element.

The projector lens 3 can be configured by a single lens. Alternatively, the projector lens 3 can be configured by a plurality of lenses. However, as the number of lenses increases, light utilization efficiency decreases. Therefore, it is preferred that the projector lens 3 be configured by one or two lenses. The material of the projector lens 3 is not limited to transparent resin and can be any refraction material with transparency.

The projector lens 3 projects the intermediate images IMa, IMb, IMc individually and casts light distribution patterns Da, Db, Dc onto the illuminated face 9.

The illuminated face 9 is disposed in a position 25 meters ahead of the headlight module 100, for example. The distance between the intermediate image IMa and the projector lens 3 is 50 mm or less, for example. The optical system for forming an image 25 meters ahead can therefore be called an infinity optical system.

Accordingly, the projector lens 3 is disposed in such a manner that the position of the front-side focal point agrees with the intermediate image IMa. The "front-side focal point" is a focal point on the side where light enters the lens. In FIG. 1, it is the focal point on the side of the −z-axis direction.

The position of the front-side focal point of the projector lens 3, however, can be placed ahead (+z-axis direction) in the direction of the optical axis with respect to the position of the intermediate image IMa. By moving the position of the front-side focal point of the projector lens 3 in such a manner, gaps among the respective intermediate images IMa, IMb, IMc, their boundaries, or the like can be blurred appropriately. Depending on the arrangement position in the direction of the optical axis of the projector lens 3, unevenness in illumination intensity can be suppressed on the light distribution pattern projected ahead of the vehicle.

(Light Distribution Pattern)

Figure 3:
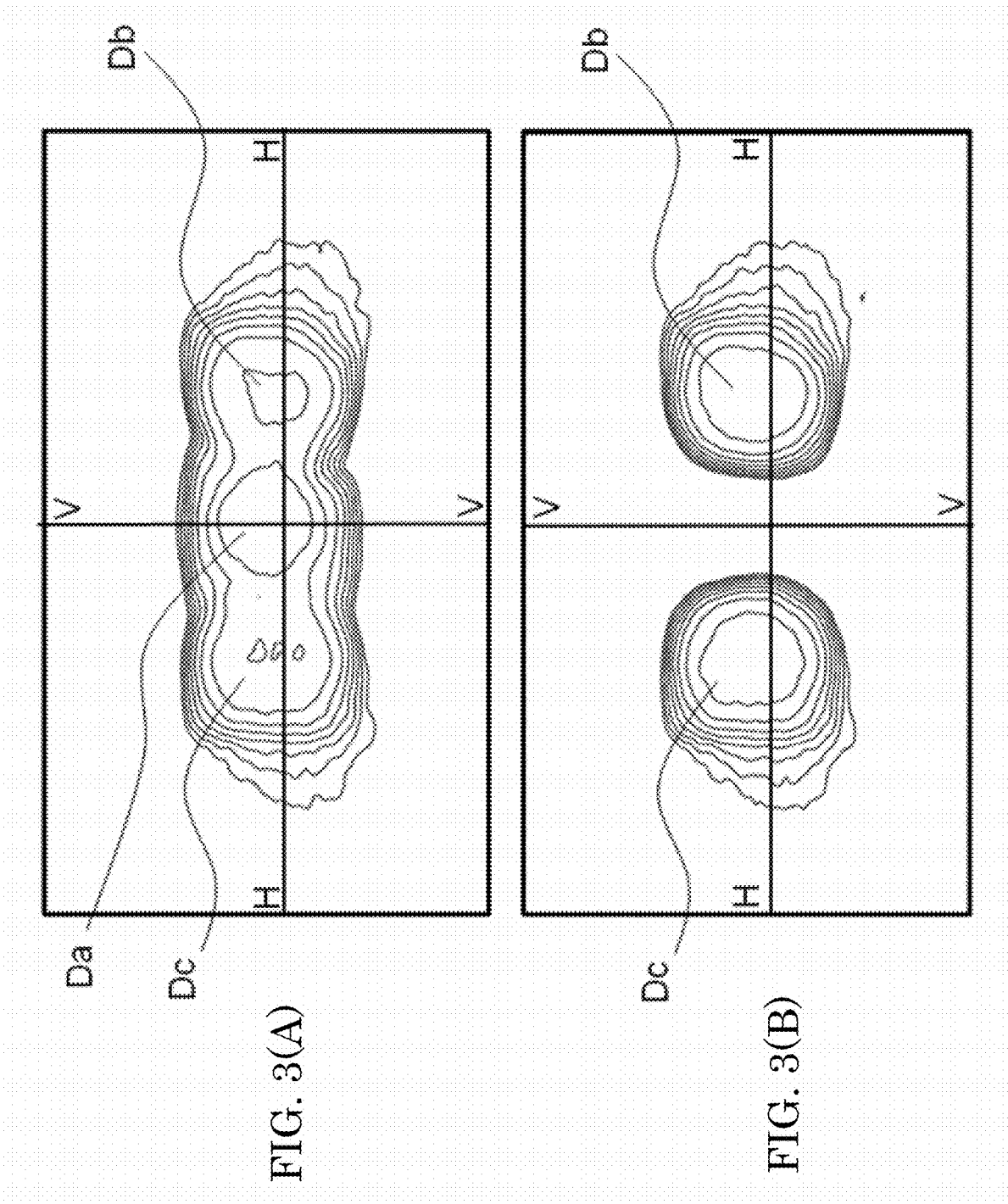
FIG. 3 is a diagram showing simulation results of light distribution patterns on an illuminated face 9 of the headlight module 100 according to the first embodiment.

FIGS. 3(A) and 3(B) are diagrams showing simulation results of light distribution patterns on the illuminated face 9 of the headlight module 100. FIGS. 3(A) and 3(B) are diagrams showing contour drawings of illumination intensity distribution on the illuminated face 9 of the headlight module 100. "contour drawings" is to display by a contour map. The "contour map" is a drawing showing lines joining points having the same value.

The horizontal axes of FIGS. 3(A) and 3(B) represent the position in the horizontal direction (x-axis direction) on the illuminated face 9. The horizontal axis is represented by line H-H. The vertical axes of FIGS. 3(A) and 3(B) represent the position in the vertical direction (y-axis direction) on the illuminated face 9. The vertical axis is represented by line V-V.

FIG. 3(A) shows simulation results of a light distribution pattern when the light source 1a, light source 1b, and light source 1c are all turned on. FIG. 3(B) shows simulation results when the light source 1b and the light source 1c are turned on. In short, the light source 1a is turned off in FIG. 3(B).

In FIG. 3(A), the light distribution patterns Da, Db, Dc of the intermediate images IMa, IMb, IMc are cast. On the boundary between the light distribution pattern Da and the light distribution pattern Db, unevenness in illumination intensity does not occur. On the boundary between the light distribution pattern Da and the light distribution pattern Dc, unevenness in illumination intensity does not occur. The three light distribution patterns Da, Db, Dc form a single combined light distribution pattern D. The single combined light distribution pattern D has a clear outline.

The headlight module 100 casts the intermediate images IMa, IMb, IMc onto the illuminated face 9. Accordingly, by adjusting the disposition of the condenser lenses 2a, 2b, 2c, the boundaries among the intermediate images IMa, IMb, IMc can be eliminated. The headlight module 100 can suppress a dark area that occur on the boundaries among the respective light distribution patterns Da, Db, Dc.

In FIG. 3(B), just the light distribution pattern Da becomes a non-illuminated area. The non-illuminated area is an area in which light is not illuminated. The boundaries among the non-illuminated area and the light distribution patterns Db, Dc are clear. In other words, intervals between contour lines are narrowed at the edges of the light distribution patterns Db, Dc on the side of the non-illuminated area.

In FIG. 3(B), the area of the light distribution pattern Da is a non-illuminated area. Therefore, in a case where a non-illuminated area is required in an arbitrary position ahead of the vehicle, it can be implemented easily just by controlling the turning on or off of the light source 1.

The light source 1 using an LED can vary the amount of light continuously not only by turning it on or off. Therefore, the non-illuminated area can be an area in which illumination intensity is suppressed.

Figure 4:
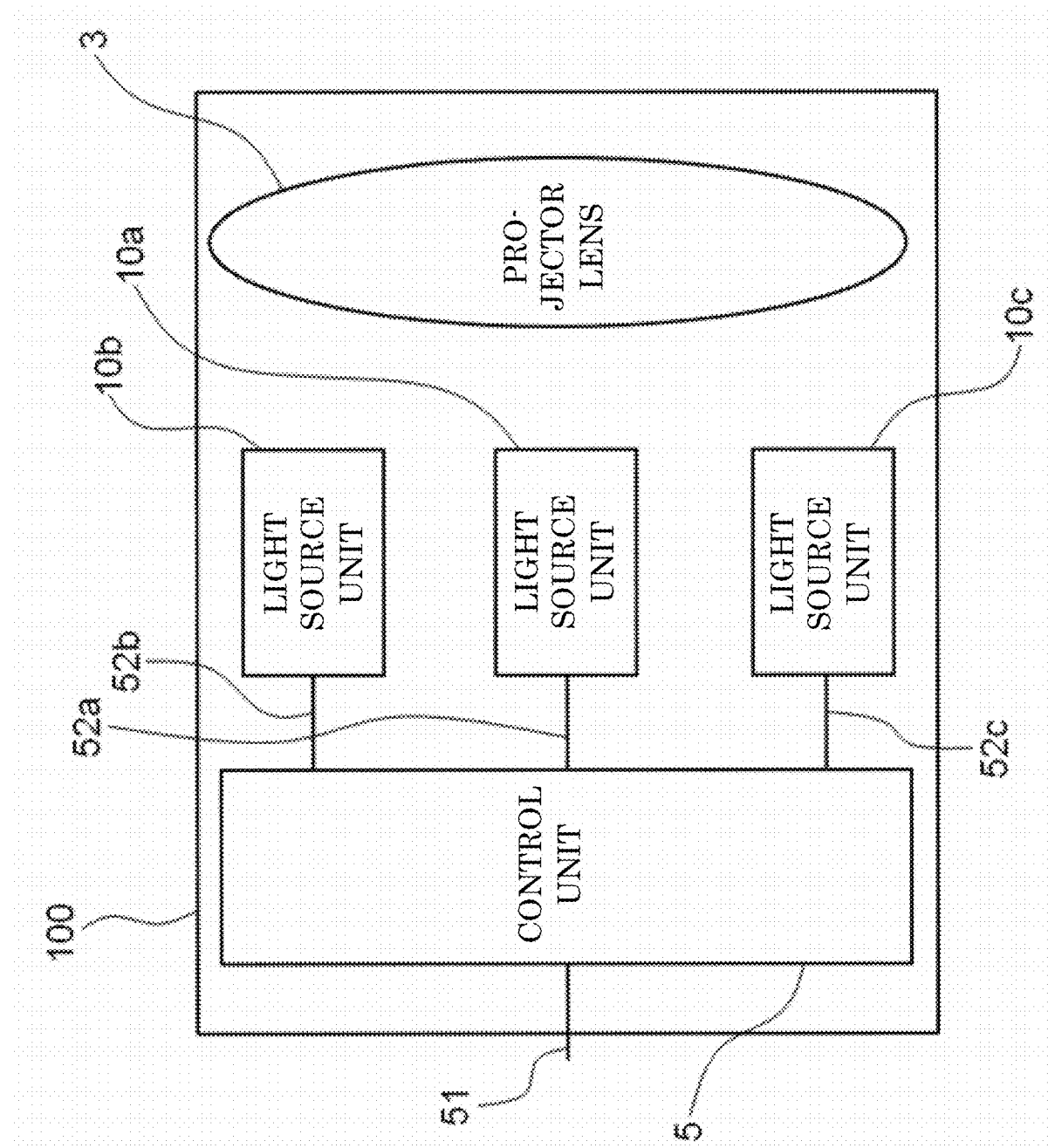
FIG. 4 is a configuration diagram showing a configuration for controlling turning on and turning of light source units 10a, 10b, and 10c individually according to the first embodiment.

FIG. 4 is a configuration diagram showing a configuration for controlling turning on and turning of the light source units 10a, 10b, and 10c individually. The headlight module 100 includes a control unit 5.

The control unit 5 receives a control signal 51 from the outside.

The light source units 10a, 10b, 10c receive control signals 52a, 52b, 52c from the control unit 5. In the first embodiment, the light sources 1a, 1b, 1c receive the control signals 52a, 52b, 52c from the control unit 5. The control signal 52a, the control signal 52b, and the control signal 52c are referred to together as a control signal 52.

The control unit 5 controls turning on and turning off of the light source units 10a, 10b, 10c individually on the basis of the control signal 51. In the first embodiment, the control unit 5 controls turning on and turning off of the light sources 1a, 1b, 1c individually on a basis of the control signal 51.

(Headlight Module 100)

In the headlight module 100 according to the first embodiment, an optical system can be configured by the condenser lens 2 and the projector lens 3. In other words, the headlight module 100 can be configured without using a reflector, a light guiding member, or the like. In comparison with the conventional configuration using a reflector, the module can reduce the divergence angle of light more easily in the position of the intermediate image IM. Therefore, the diameter of the projector lens 3 can be reduced. The headlight module 100 can be downsized as well. The headlight module 100 also has high light utilization efficiency.

In the headlight module 100 according to the first embodiment, the intermediate images IMa, IMb, IMc are arranged without gaps in the horizontal direction (x-axis direction). However, the arrangement is not limited to that way, and the adjacent intermediate images IM can also be arranged with space left among them.

In this case, for example, a plurality of headlight modules having a non-illuminated area in the light distribution pattern D are prepared. The area which is not illuminated by light of the light distribution of each of the headlight module is supplemented by illuminating with another headlight module.

The plurality of headlight modules form an intermediate image having no gaps. In other words, an area that is not illuminated by light of the light distribution pattern D of one headlight module is complemented by the light distribution pattern D of another headlight module. A headlight apparatus 200 having a plurality of headlight modules will be described later.

However, in order to downsize the headlight apparatus, it is preferred to form an intermediate image IM having no gaps by an individual headlight module. An assembly of the headlight apparatus can be easily performed as well.

In other words, a problem of increasing the apparatus in size arises as described earlier. Since the plurality of headlight modules form a single light distribution pattern, the positioning of the headlight modules becomes hard. In addition to the first embodiment, a plurality of projector lenses 3 needs to be included.

The headlight module 100 includes the light source 1, the condensing optical element 2, and the projecting optical element 3. The light source 1 emits light as projection light. The condensing optical element 2 collects light emitted from the light source 1 to form collected light, thereby forming an intermediate image IM. A plurality of light sources 1 is included. The projecting optical element 3 magnifies and projects the plurality of intermediate images IMa, IMb, IMc formed by rays output from the plurality of light sources 1a, 1b, 1c.

The condensing optical element 2 has a function of refracting passing light.

The plurality of intermediate images IMa, IMb, IMc are linked together at the parts corresponding to the edges of the light emitting face 11 of the light source 1, to form a single image.

In the first embodiment, the condensing optical element 2 is described as a condenser lens as an example. The projecting optical element 3 is described as a projector lens as an example.

The intermediate images IMa, IMb, IMc formed by the respective rays projected from the plurality of light sources 1a, 1b, 1c are arranged continuously.

The plurality of intermediate images IMa, IMb, IMc formed by the respective projected rays output from the plurality of light sources 1a, 1b, 1c become a single image formed by a bright part.

The headlight module 100 forms a high-luminous-intensity area by superimposing an intermediate image IM on another intermediate image IM.

The headlight module 100 includes a control unit 5 which turns on or turns off the light source 1. The headlight module 100 changes the image IM formed by the plurality of intermediate images IMa, IMb, IMc by turning on or turning off the light sources 1a, 1b, 1c.

Second Embodiment

Figure 5:
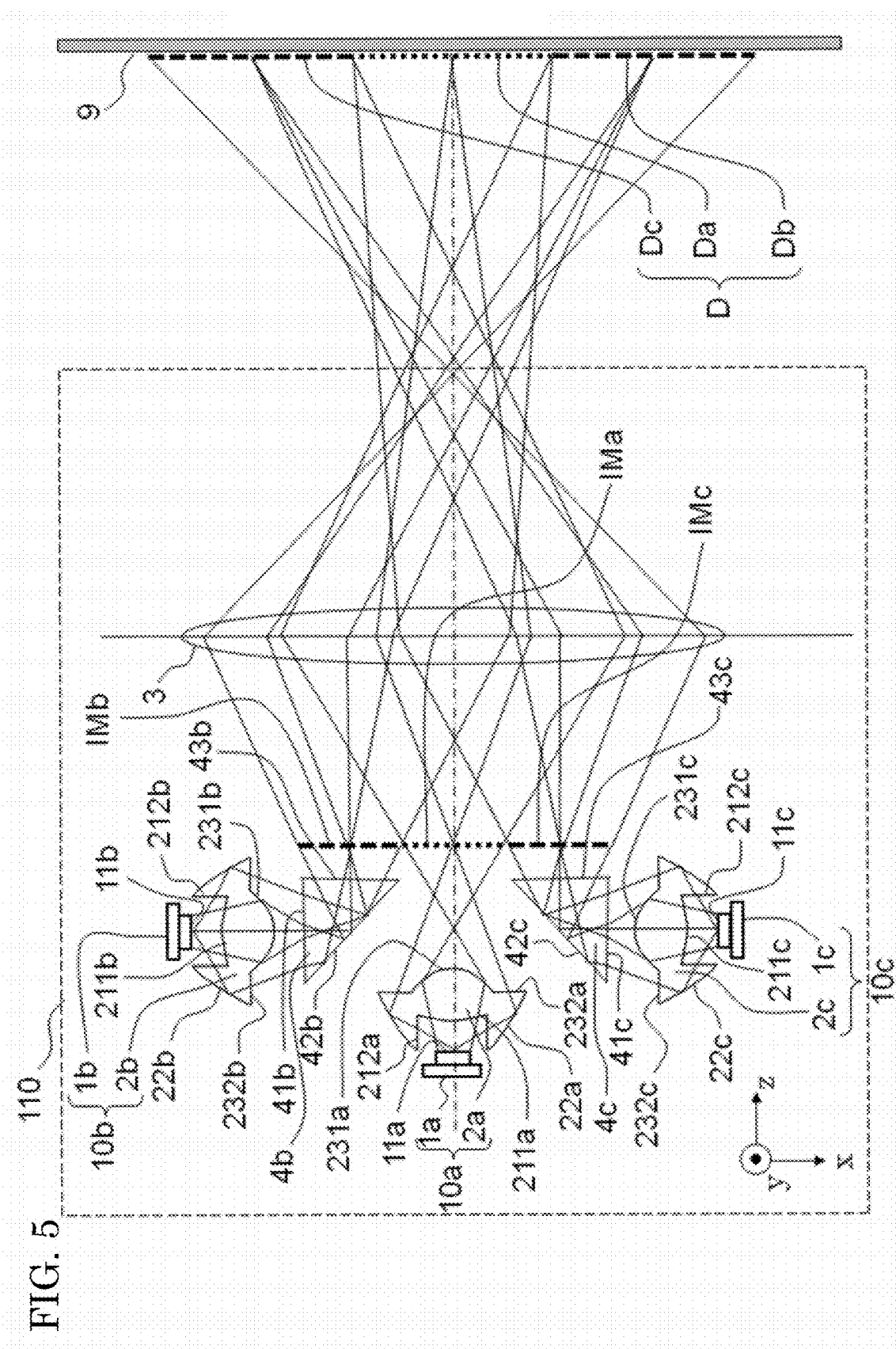
FIG. 5 is a configuration diagram showing a configuration of a headlight module 110 according to a second embodiment.

FIG. 5 is a configuration diagram showing the configuration of a headlight module 110 according to a second embodiment of the present invention. Components identical to the components in FIG. 1 will be denoted by the same reference characters, and the description of the components will be omitted. The components identical to the components in FIG. 1 are the light sources 1a, 1b, 1c, the condenser lenses 2a, 2b, 2c, and the projector lens 3. If the description of the structure, function, operation, or the like of the components identical to those in the first embodiment is omitted in the second embodiment, the description in the first embodiment is substituted. Description of the first embodiment given in the second embodiment is used as the description of the first embodiment. The "operation" here includes the behavior of light.

As shown in FIG. 5, the headlight module 110 according to the second embodiment includes the light sources 1a, 1b, 1c, the condenser lenses 2a, 2b, 2c, prisms 4b, 4c, and the projector lens 3. In other words, the headlight module 110 according to the second embodiment differs from the headlight module 100 according to the first embodiment in that the prisms 4b, 4c are included.

In the second embodiment, the prisms 4b, 4c will be used for explanation, but an optical element which changes the traveling direction of light, such as a reflection mirror, can also be used. The optical element which changes the traveling direction of light is referred to as an "optical-path changing element." The prisms 4b, 4c are examples of the optical-path changing element. In other words, the headlight module 110 according to the second embodiment includes the light sources 1a, 1b, 1c, the condenser lenses 2a, 2b, 2c, the optical-path changing elements 4b, 4c, and the projector lens 3.

The headlight module 100 according to the first embodiment arranges the intermediate images IMa, IMb, IMc in such a manner that the boundaries of the intermediate images IMa, IMb, IMc are not disconnected. In other words, the intermediate images IMa, IMb, IMc are placed in contact with one another. The condenser lenses 2a, 2b, 2c have a fixed size, however. Thus, in order to form the intermediate images IMa, IND, IMc continuously by positioning the condenser lenses 2a, 2b, 2c free from interference from one another, limitations are imposed on the disposition of the light sources 1a, 1b, 1c and the condenser lenses 2a, 2b, 2c.

In order to form the intermediate images IMa, IMb, IMc with no gaps, the light sources 1b, 1c and the condenser lenses 2b, 2c in the headlight module 100 are disposed around an axis parallel to the y-axis.

In short, the optical axes of the light source 1b and the condenser lens 2b are inclined with respect to the optical axis of the projector lens 3.

The optical axes of the light source 1b and the condenser lens 2b cross the optical axis of the projector lens 3 on the side of the +z-axis direction of the condenser lens 2b. In FIG. 1, the light source unit 10b viewed from the +y-axis direction is disposed by turning clockwise from the position of the optical axis parallel to the z-axis around an axis parallel to the y-axis.

Similarly, the optical axes of the light source 1c and the condenser lens 2c are inclined with respect to the optical axis of the projector lens 3.

The optical axes of the light source 1c and the condenser lens 2c cross the optical axis of the projector lens 3 on the side of the +z-axis direction of the condenser lens 2c. In FIG. 1, the light source unit 10c viewed from the +y-axis direction is disposed by turning counterclockwise from the position of the optical axis parallel to the z-axis around an axis parallel to the y-axis.

In the headlight module 100, because of the configuration, the intermediate image IMa, the intermediate image IMb, and the intermediate image IMc are not formed on a single plane. The intermediate image IMa is formed parallel to a plane (x-y plane) perpendicular to the optical axis of the projector lens 3. The intermediate image IMb and the intermediate image IMc are formed with an inclination with respect to a plane (x-y plane) perpendicular to the optical axis of the projector lens 3.

This can result in the possibility that the light distribution pattern cannot have a clear outline in the periphery. In short, there is a danger that the light distribution pattern Db cannot have a clear outline on the side of the +x-axis direction. There is also a danger that the light distribution pattern Dc cannot have a clear outline on the side of the −x-axis direction. There is a danger that a clear outline cannot be implemented in a position apart from the optical axis of the projector lens 3 of the light distribution patterns Db, Dc.

The inclined disposition of the condenser lenses 2b, 2c causes the angle at which rays enter the projector lens 3 with respect to the optical axis of the projector lens 3 to increase. In order to prevent light utilization efficiency from deteriorating, the projector lens 3 needs to have such a large diameter that the rays can enter. Accordingly, it is possible that the projector lens 3 becomes large.

An advantage of the headlight module 100 according to the first embodiment is that it is composed of a small number of items. On the other hand, the headlight module 110 according to the second embodiment solves the problem described above. The headlight module 110 has flexibility in the disposition of the light sources 1a, 1b, 1c and the condenser lenses 2a, 2b, 2c and implements light distribution patterns Da, Db, Dc having clear outlines.

Figure 6:
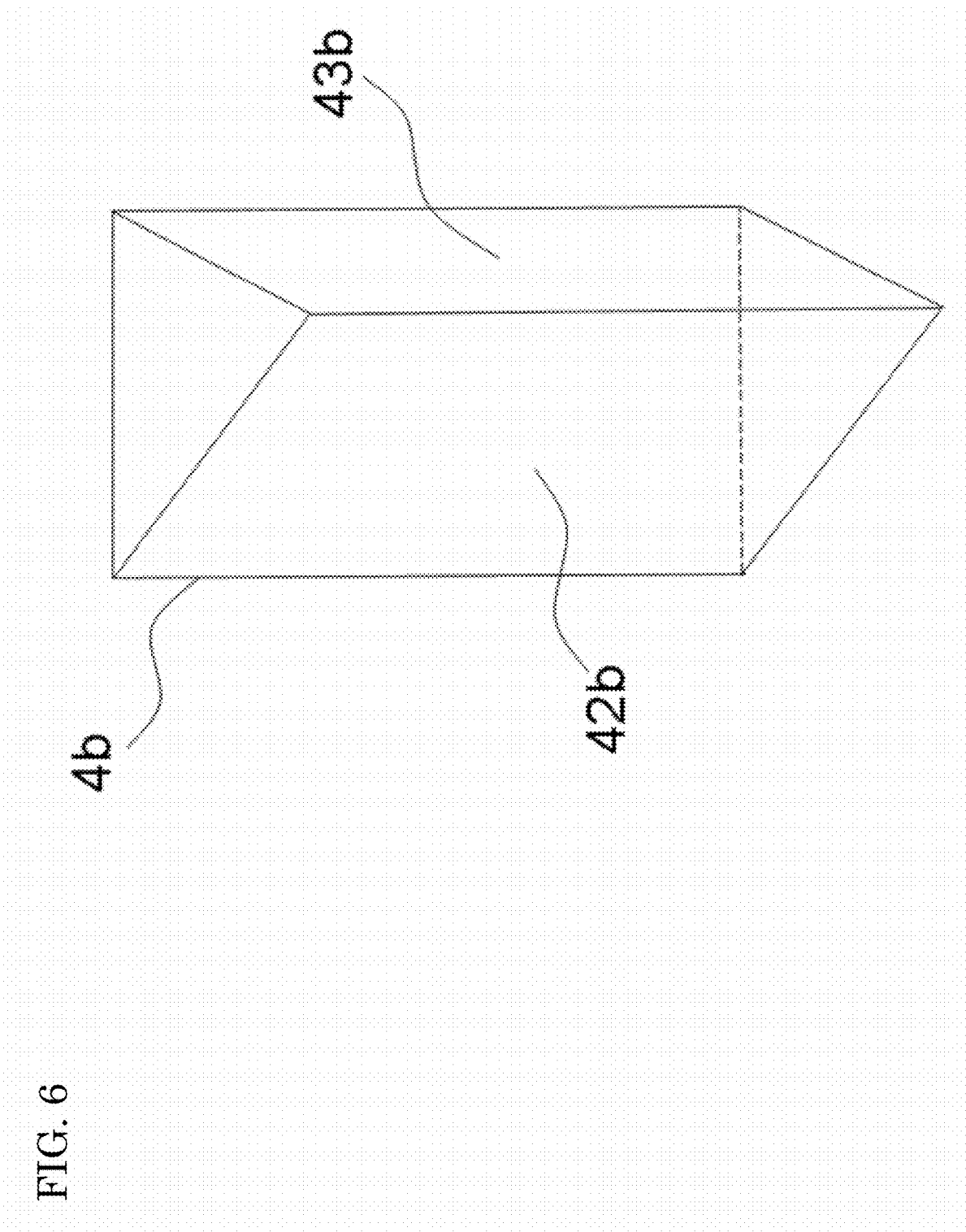
FIG. 6 is a perspective view of a prism 4b of the headlight module 110 according to the second embodiment.

FIG. 5 is a configuration diagram showing the configuration of the headlight module 110 according to the second embodiment. FIG. 6 is a perspective view of the prism 4b. Description will be made by using the xyz coordinate system as used in the first embodiment.

(Prisms 4b, 4c)

As shown in FIG. 5, the prisms 4b, 4c have a function to change the traveling directions of rays emitted from the light sources 1b, 1c. Since the prisms 4b, 4c have the same shape and function, the prism 4b will here be described as an example.

As shown in FIG. 6, the prism 4b has a shape of a triangular prism, for example. The prism 4c also has a shape of a triangular prism.

The "triangular prism" is a prism having triangular bases. The prism is a prismatic body having polygonal bases, namely a polyhedron formed by rectangles (lateral faces) lying between two identical and parallel polyhedrons. The faces other than the bases of the prismatic body are referred to as lateral faces. The distance between the two bases of the prismatic body is referred to as the height.

The lateral faces of the prism 4b are an incident face 41b, from which light enters, a reflection face 42b, which reflects the incident light, and an output face 43b, which lets the reflected light exit.

The prism 4b is made of transparent resin, glass, a silicone material, or the like.

The prism 4b is disposed in the −x-axis direction with respect to the optical axis of the projector lens 3, as shown in FIG. 5. The condenser lens 2b is disposed on the side of the −x-axis direction of the prism 4b. The light source 1b is disposed on the side of the −x-axis direction of the condenser lens 2b. The combination of the light source 1b and the condenser lens 2b is referred to as a light source unit 10b. In short, the light source unit 10b is disposed on the side of the −x-axis direction of the prism 4b.

Light emitted from the center of the light emitting face 11b of the light source 1b perpendicularly to the light emitting face 11b travels on the optical axis of the condenser lens 2b. The optical axis of the light source unit 10b is disposed parallel to the x-axis.

A plane corresponding to the base of the triangular prism of the prism 4b is parallel to the z-x plane. The incident face 41b is parallel to the y-z plane. The output face 43b is parallel to the x-y plane. The reflection face 42b is parallel to a plane obtained by rotating the y-z plane 45 degrees clockwise, viewed from the +y-axis direction.

The incident face 41b is disposed to face the light emitting face 11a of the light source 1b. The output face 43b is disposed to face the projector lens 3.

The shape and disposition of the prism 4b are indicated as an example, and another shape or disposition can be adopted if an intermediate image IM is formed on a single plane.

The optical axes of the light source 1b and the condenser lens 2b are in a plane parallel to the z-x plane including the optical axis of the projector lens 3. The optical axes of the light source 1b and the condenser lens 2b are parallel to the x-axis.

Rays emitted from the light source 1b travel in the +x-axis direction. The rays travelling in the +x-axis direction are then collected by the condenser lens 2b. The condensed light collected by the condenser lens 2b enter the prism 4b from the incident face 41b of the prism 4b. The rays entering the prism 4b are reflected by the reflection face 42b toward the +z-axis direction. The +z-axis direction is a direction toward the front of the vehicle. The reflected light reflected in the +z-axis direction exit from the output face 43b.

In view of light utilization efficiency, it is preferable to use total reflection of light reflected by the reflection face 42b.

Light emitted from the center of the light emitting face 11b of the light source 1b perpendicularly to the light emitting face 11b is converted to light parallel to the optical axis of the projector lens 3.

The incident face 41b, the reflection face 42b, and the output face 43b are disposed in such a manner.

The rays exiting from the output face 43b form an intermediate image IMb. The intermediate image IMb is formed parallel to the x-y plane. The intermediate image IMb is cast by the projector lens 3 as a light distribution pattern Db onto the illuminated face 9.

The prism 4c is disposed in the +x-axis direction with respect to the optical axis of the projector lens 3, as shown in FIG. 5. The condenser lens 2c is disposed on the side of the +x-axis direction of the prism 4c. The light source 1c is disposed on the side of the +x-axis direction of the condenser lens 2c. The combination of the light source 1c and the condenser lens 2c is called a light source unit 10c. In short, the light source unit 10c is disposed on the side of the +x-axis direction of the prism 4c.

Light emitted from the center of the light emitting face 11c of the light source 1c perpendicularly to the light emitting face 11c travels on the optical axis of the condenser lens 2c. The optical axis of the light source unit 10c is disposed parallel to the x-axis.

A plane corresponding to the base of the triangular prism of the prism 4c is parallel to the z-x plane. The incident face 41c is parallel to the y-z plane. The output face 43c is parallel to the x-y plane. The reflection face 42c is parallel to a plane obtained by rotating the y-z plane 45 degrees counterclockwise, viewed from the +y-axis direction.

The incident face 41c is disposed to face the light emitting face 11c of the light source 1c. The output face 43c is disposed to face the projector lens 3.

The shape and disposition of the prism 4c are indicated as an example, and another shape or disposition can be adopted if an intermediate image IM is formed on a single plane.

The optical axes of the light source 1c and the condenser lens 2c are in a plane parallel to the z-x plane including the optical axis of the projector lens 3. The optical axes of the light source 1c and the condenser lens 2c are also parallel to the x-axis.

Rays emitted from the light source 1c travel in the −x-axis direction. The rays travelling in the −x-axis direction are collected by the condenser lens 2c. The condensed light collected by the condenser lens 2c enter the prism 4c from the incident face 41c of the prism 4c. The rays entering the prism 4c are reflected by the reflection face 42c in the +z-axis direction. The +z-axis direction is a direction toward the front of the vehicle. The reflected light reflected in the +z-axis direction exit from the output face 43c.

In view of light utilization efficiency, it is preferable to use total reflection of light reflected by the reflection face 42c.

Light emitted from the center of the light emitting face 11c of the light source 1c perpendicularly to the light emitting face 11c is converted to light parallel to the optical axis of the projector lens 3.

The incident face 41c, the reflection face 42c, and the output face 43c are disposed in such a manner.

Rays exiting from the output face 43c form an intermediate image IMc. The intermediate image IMc is formed parallel to the x-y plane. The intermediate image IMc is cast by the projector lens 3 as a light distribution pattern Dc onto the illuminated face 9.

(Light Distribution Pattern)

Figure 7A:
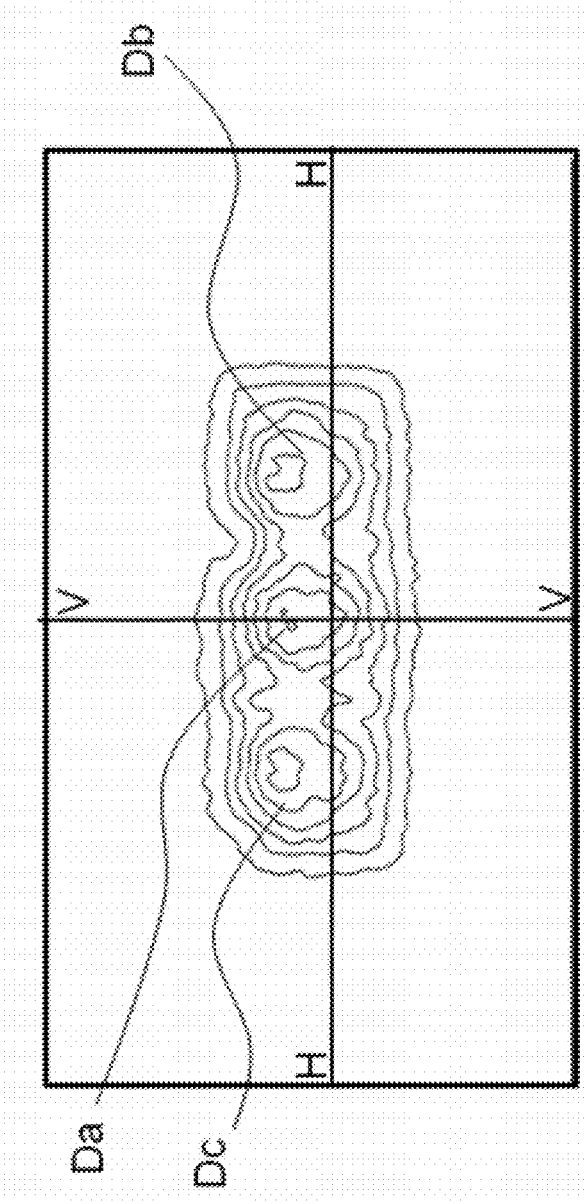
FIG. 7 is a diagram showing simulation results of light distribution patterns on an illuminated face 9 of the headlight module 110 according to the second embodiment.
Figure 7B:
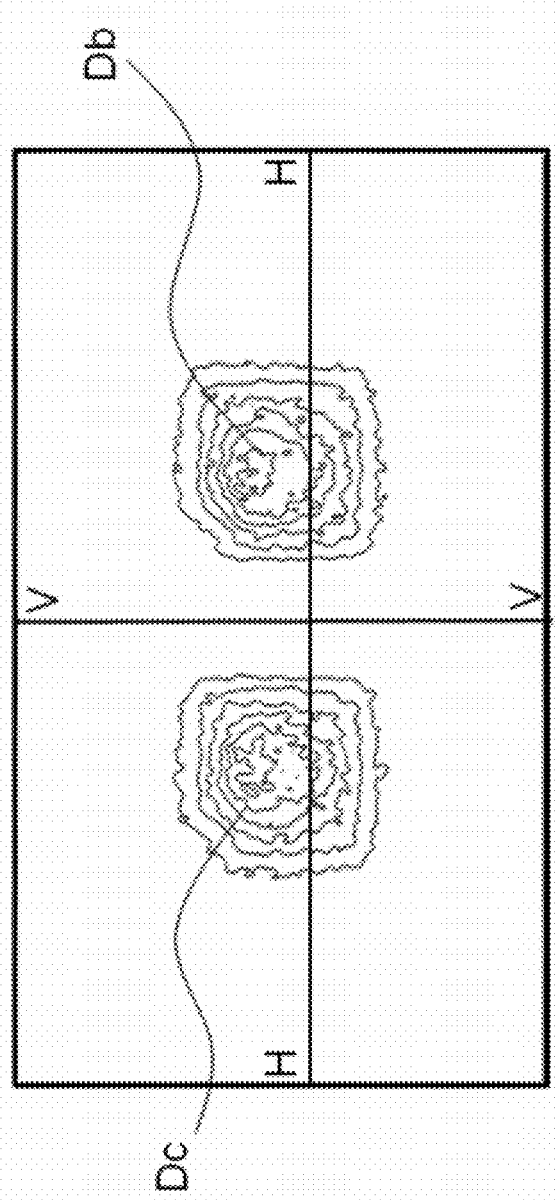

FIGS. 7(A) and 7(B) are diagrams showing simulation results of light distribution patterns on the illuminated face 9 of the headlight module 110. FIGS. 7(A) and 7(B) are diagrams showing contour drawings of illumination intensity distribution on the illuminated face 9 of the headlight module 110.

The horizontal axes of FIGS. 7(A) and 7(B) represent the position in the horizontal direction (x-axis direction) on the illuminated face 9. The horizontal axis is represented by line H-H. The vertical axes of FIGS. 7(A) and 7(B) represent the position in the vertical direction (y-axis direction) on the illuminated face 9. The vertical axis is represented by line V-V.

FIG. 7(A) shows simulation results of a light distribution pattern when the light source 1a, the light source 1b, and the light source 1c are all turned on. FIG. 7(B) shows simulation results when the light source 1b and the light source 1c are turned on. In short, the light source 1a is off in FIG. 7(B).

In FIG. 7(A), the light distribution patterns Da, Db, Dc of the intermediate images IMa, IMb, IMc are cast. On the boundary between the light distribution pattern Da and the light distribution pattern Db, unevenness in illumination intensity does not occur. On the boundary between the light distribution pattern Da and the light distribution pattern Dc, unevenness in illumination intensity does not occur. The three light distribution patterns Da, Db, Dc form a single combined light distribution pattern D. The single combined light distribution pattern D has a clear outline.

The headlight module 110 casts the intermediate images IMa, IMb, IMc onto the illuminated face 9. Accordingly, by adjusting the disposition of the condenser lenses 2a, 2b, 2c or the disposition of the prisms 4b, 4c, the boundaries among the intermediate images IMa, IMb, IMc can be eliminated. The headlight module 110 can suppress a dark area that could occur on the boundaries among the light distribution patterns Da, Db, Dc.

In FIG. 7(B), just the light distribution pattern Da becomes a non-illuminated area. "The non-illuminated area" is an area in which light is not illuminated. The boundaries among the non-illuminated area and the light distribution patterns Db, Dc are clear. In other words, intervals between contour lines are narrowed in the edges of the light distribution patterns Db, Dc on the side of the non-illuminated area.

In FIG. 7(B), the area of the light distribution pattern Da is the non-illuminated area. Therefore, if the non-illuminated area is required in an arbitrary position ahead of the vehicle, it can be implemented easily just by controlling the turning on or turning off of the light source 1.

The light source 1 using an LED can vary the amount of light continuously not only by turning it on or off. Therefore, the non-illuminated area can be an area in which illumination intensity is suppressed.

A configuration for controlling turning on and turning of the light sources 1a, 1b, 1c individually is the same as in the first embodiment, and the description will be omitted.

(Headlight Module 110)

As in the first embodiment, the light source 1a and the condenser lens 2a are disposed on the optical axis of the projector lens 3. The combination of the light source 1a and the condenser lens 2a is called a light source unit 10a. Light emitted from the center of the light emitting face 11a of the light source 1a perpendicularly to the light emitting face 11a travel on the optical axis of the condenser lens 2a. The condenser lens 2a is disposed in the −z-axis direction of the projector lens 3. The light source 1a is disposed in the −z-axis direction of the condenser lens 2a.

The light source 1b and the condenser lens 2b are disposed on the side of the −x-axis direction with respect to the optical axis of the projector lens 3. The prism 4b is disposed between the condenser lens 2b and the optical axis of the projector lens 3. The combination of the light source 1b and the condenser lens 2b is called a light source unit 10b. Light emitted from the center of the light emitting face 11b of the light source 1b perpendicularly to the light emitting face 11b travels on the optical axis of the condenser lens 2b. The prism 4b is disposed in the −z-axis direction of the projector lens 3. The condenser lens 2b is disposed in the −x-axis direction of the prism 4b. The light source 1b is disposed in the −x-axis direction of the condenser lens 2b.

The light source 1c and the condenser lens 2c are disposed on the side of the +x-axis direction with respect to the optical axis of the projector lens 3. The prism 4c is disposed between the condenser lens 2c and the optical axis of the projector lens 3. The combination of the light source 1c and the condenser lens 2c is called a light source unit 10c. Light emitted from the center of the light emitting face 11c of the light source 1c perpendicularly to the light emitting face 11c travels on the optical axis of the condenser lens 2c. The prism 4c is disposed in the −z-axis direction of the projector lens 3. The condenser lens 2c is disposed in the +x-axis direction of the prism 4c. The light source 1c is disposed in the +x-axis direction of the condenser lens 2c.

The light source 1b and the condenser lens 2b are disposed on the side of the −x-axis direction of the optical axis of the projector lens 3, with the prism 4b placed between them. Therefore, the light source 1b and the condenser lens 2b are placed not in close vicinity to the light source 1a and the condenser lens 2a. In other words, the light source 1b and the condenser lens 2b are disposed at a distance from the light source 1a and the condenser lens 2a. The light source unit 10b is disposed at a position apart from the light source unit 10a.

By disposing the light source 1b, condenser lens 2b, and prism 4b as described above, the light source 1b is disposed at a position apart from the light source 1a. This makes it possible to prevent a board or the like attached to the light source 1b from interfering with a board attached to the light source 1a.

By disposing the light source 1b, condenser lens 2b, and prism 4b as described above, the prism 4b can be disposed near the optical axis of the projector lens 3. This makes it easy for the intermediate image IMb to adjoin the boundary of the intermediate image IMa. The intermediate image IMb also becomes an image perpendicular to the optical axis of the projector lens 3. This configuration makes it easy for the light distribution pattern Db to have a clear outline in its periphery.

Similarly, the light source 1c and the condenser lens 2c are disposed on the side of the +x-axis direction of the optical axis of the projector lens 3, with the prism 4c placed between them. Therefore, the light source 1c and the condenser lens 2c are placed not in close vicinity to the light source 1a and the condenser lens 2a. In other words, the light source 1c and the condenser lens 2c are disposed at a distance from the light source 1a and the condenser lens 2a. The light source unit 10c is disposed at a position apart from the light source unit 10a.

By disposing the light source 1c, the condenser lens 2c, and the prism 4c as described above, the light source 1c is disposed at a position apart from the light source 1a. This makes it possible to prevent a board or the like attached to the light source 1c from interfering with a board attached to the light source 1a.

By disposing the light source 1c, the condenser lens 2c, and the prism 4c as described above, the prism 4c can be disposed near the optical axis of the projector lens 3. This makes it easy for the intermediate image IMc to adjoin the boundary of the intermediate image IMa. The intermediate image IMc also becomes an image perpendicular to the optical axis of the projector lens 3. This configuration makes it easy for the light distribution pattern Dc to have a clear outline in its periphery.

Light emitted from the center of the light emitting face 11b of the light source 1 perpendicularly to the light emitting face 11b exits from the prism 4b, in parallel with the optical axis of the projector lens 3. Similarly, light emitted from the center of the light emitting face 11c of the light source 1 perpendicularly to the light emitting face 11c exits from the prism 4c, in parallel with the optical axis of the projector lens 3. Therefore the angle at which light enters the projector lens 3 becomes smaller than that in the headlight module 100 according to the first embodiment. This makes it possible to downsize the projector lens 3.

In the headlight module 100 according to the first embodiment, the light source 1b and the condenser lens 2b are disposed near the light source 1a and the condenser lens 2a. In other words, in the headlight module 100, the light source unit 10b is disposed near the light source unit 10a.

In the headlight module 100, the light source 1c and the condenser lens 2c are also disposed near the light source 1a and the condenser lens 2a. In other words, in the headlight module 100, the light source unit 10c is disposed near the light source unit 10a.

On the other hand, in the headlight module 110, the light source 1b and the condenser lens 2b are disposed at a distance from the light source 1a and the condenser lens 2a. In other words, in the headlight module 110, the light source unit 10b is disposed at a distance from the light source unit 10a.

Similarly, in the headlight module 110, the light source 1c and the condenser lens 2c are also disposed at a distance from the light source 1a and the condenser lens 2a. In other words, in the headlight module 110, the light source unit 10c is disposed at a distance from the light source unit 10a. "Being disposed at a distance" means that one thing is disposed not in vicinity to another thing. In short, it means that a distance can be kept between the two things.

By disposing the prisms 4b, 4c between the optical axis of the projector lens 3 and the light source units 10b, 10c, a distance can be kept between them.

By using the prisms 4b, 4c to bend the optical axes of the light source units 10b, 10c aggressively, a distance can be kept between the light sources 1b, 1c and the light source 1a, in comparison with the headlight module 100. "To keep a distance" means "to leave a space."

Accordingly, it is easy to avoid interference among individual parts in the headlight module 110. The headlight module 110 therefore can reduce limitations on the positions where the intermediate images IMa, IMb, IMc are generated. The headlight module 110 can consequently have many options about the positions where the intermediate images IMa, IMb, IMc are generated, on the optical system design. Therefore, for example, it becomes possible to reduce the distance between the light source 1 and the intermediate image IM, to reduce the dimension of the headlight module 110 in the direction of the optical axis.

In the headlight module 110 according to the second embodiment, an optical system can be configured with the condenser lens 2, the projector lens 3, and the prism 4. The headlight module 110 can be configured without a reflector. Since the condenser lens 2 is a condensing optical element having the refraction function (refractive condensing optical element), the divergence angle of light in the position of the intermediate image IM can be reduced more easily, in comparison with the conventional configuration using a reflector. Therefore, the diameter of the projector lens 3 can be reduced. The headlight module 110 can be downsized as well. The headlight module 110 also has high light utilization efficiency.

By using the prism 4, the headlight module 110 can adjust more easily the direction in which rays are output from the optical system that forms the intermediate image IM, in comparison with the headlight module 100 according to the first embodiment. In the headlight module 100, the optical system that forms the intermediate image IM is the light source 1 and the condenser lens 2. In the headlight module 110, the optical system that forms the intermediate image IMb is the light source 1b, the condenser lens 2b, and the prism 4b. In the headlight module 110, the optical system that forms the intermediate image IMc is the light source 1c, the condenser lens 2c, and the prism 4c.

In the headlight module 110, it is easy to reduce the angle of divergence of light in the position of the intermediate image IM. Therefore, the diameter of the projector lens 3 can be reduced further. The headlight module 110 can be downsized as well. The headlight module 110 also has high light utilization efficiency.

In the headlight module 110 according to the second embodiment, the intermediate images IMa, IMb, IMc are arranged without gaps in the horizontal direction (x-axis direction). The arrangement is not limited to that way, and the adjacent intermediate images IM can also be arranged with space left among them.

In this case, for example, a plurality of headlight modules having a non-illuminated area in the light distribution pattern D are prepared. The area which is not illuminated by light of the light distribution of each headlight module is supplemented by illuminating with another headlight module.

The plurality of headlight modules form an intermediate image having no gaps. In other words, an area that is not illuminated by light of the light distribution pattern D of one headlight module is made up with the light distribution pattern D of another headlight module. A headlight apparatus 200 having a plurality of headlight modules will be described later.

However, rather by forming a continuous intermediate image IM by an individual headlight module, the headlight apparatus can be downsized. An assembly of the headlight apparatus can be easily performed as well.

Otherwise, a problem of increasing the apparatus in size arises as described earlier. Since the plurality of headlight modules form a single light distribution pattern, the position adjustment of the headlight modules would become hard. In addition to the first embodiment, a plurality of projector lenses 3 needs to be included.

In the example described above, each of the incident face 41, the reflection face 42, and the output face 43 of the prism 4 of the headlight module 110 according to the second embodiment are flat, but it is not limited to that example.

For example, the incident face 41, the reflection face 42, or the output face 43 can be formed by a curved surface. If the individual surface of the incident face 41, the reflection face 42, or the output face 43 is a curved surface with positive power, the intermediate image IM becomes small. The position of the intermediate image IM gets closer to the output face 43.

If the individual surface of the incident face 41, the reflection face 42, or the output face 43 is a curved surface with negative power, the intermediate image IM becomes large. The position of the intermediate image IM gets farther from the output face 43.

Therefore, if the incident face 41, the reflection face 42, or the output face 43 is formed by a curved surface, the size of the intermediate image IM and the position of the intermediate image IM can be changed. The value of illumination intensity of the light distribution patterns Da, Db, Dc can be controlled easily. If the light distribution patterns Da, Db, Dc are increased in size, the value of illumination intensity decreases. On the other hand, if the light distribution patterns Da, Db, Dc are reduced in size, the value of illumination intensity increases.

The incident face 41, the reflection face 42, or the output face 43 can also be a cylindrical face, for example. The "cylindrical face" is a face which has refractive power to cause convergence or divergence in one direction and does not have power (refractive power) in an orthogonal direction.

For example, if the cylindrical face is a curved surface having positive power only in a direction parallel to the road surface, the length of the intermediate image IM in a direction (x-axis direction) parallel to the road surface is shortened. On the other hand, if the cylindrical face is a curved surface having negative power only in a direction parallel to the road surface, the length of the intermediate image IM in a direction (x-axis direction) parallel to the road surface is lengthened.

The incident face 41, the reflection face 42, or the output face 43 can also be a toroidal face. The "toroidal face" is a face having different power (refractive power) in the x-axis direction and the y-axis direction.

The case in which the shape of the light emitting face 11 of the light source 1 is square shaped will be described. The prism 4 is disposed in such a manner that the positive power of the toroidal face in a direction parallel to the road surface becomes greater than the positive power of the toroidal face in a direction perpendicular to the road surface. With this type of toroidal face, the length of the intermediate image IM in the direction (x-axis direction) parallel to the road surface becomes shorter than that in the direction (y-axis direction) perpendicular to the road surface.

On the other hand, the prism 4 is disposed in such a manner that the positive power of the toroidal face in a direction (y-axis direction) perpendicular to the road surface becomes greater than the positive power of the toroidal face in a direction (x-axis direction) parallel to the road surface. With this type of toroidal face, the length of the intermediate image IM in the direction (x-axis direction) parallel to the road surface becomes longer than that in the direction (y-axis direction) perpendicular to the road surface.

By using a curved surface in the prism 4 (optical-path changing element) as described above, the size of the intermediate image IM can be changed. By using the curved surface in the prism 4 (optical-path changing element), the aspect ratio of the intermediate image IM can also be changed. In short, the intermediate image IM having a shape different from the light source 1 can be formed easily. By using the curved surface in the prism 4 (optical-path changing element), brightness of the intermediate image IM per unit area can also be varied.

In other words, the size of the light distribution patterns Da, Db, Dc can be varied. The light distribution patterns Da, Db, Dc having a shape different from the light source 1 can also be formed easily. The value of illumination intensity of the light distribution patterns Da, Db, Dc can be controlled easily.

The "aspect ratio" is a term indicating the ratio of the long side to the short side of a two-dimensional shape.

As described above, with the curved shape of the incident face 41, the reflection face 42, or the output face 43, the intermediate image IM can have a shape different from the shape of the light emitting face 11. By changing the shape of the intermediate image IM, the shapes of the light distribution patterns Db, Dc can have shapes different from the shape of the light distribution pattern Da, for example.

With the curved shape of the incident face 41, the reflection face 42, or the output face 43, brightness of the intermediate image IM per unit area can be controlled. By controlling the brightness of the intermediate image IM per unit area, for example, the value of illumination intensity of the light distribution pattern Da can be different from the values of illumination intensity of the light distribution patterns Db, Dc.

As described above, the curved shapes of the prisms 4b, 4c allow the shape and illumination intensity distribution of the light distribution pattern D to be controlled.

For example, the shape of the light distribution pattern Da can be a square with high illumination intensity, and the shapes of the light distribution patterns Db, Dc can be rectangles with low illumination intensity. Accordingly, a high-illumination-intensity region can be formed in the central part of the light distribution pattern D, and the peripheral area in the right-and-left direction can be low-illumination-intensity areas.

In view of the downsizing of the optical system, when increasing the divergence angle, turning the output face 43 to a curved shape would be most preferable. Alternatively, by turning the incident face 41 to a curved shape to have light be collected once, the divergence angle of light can be increased when it exits from the output face 43.

In the second embodiment, a configuration in which the headlight module 110 uses the prism 4 having the shape of a triangular prism is described above as an example. However, the configuration is not limited to the example. The lateral faces of the prism 4 are required to have three faces, which are the incident face 41, the reflection face 42, and the output face 43, at least. For example, a shape having two reflection faces or a shape having two output faces can be used. With those shapes, the shape of the intermediate image IM can be changed more easily.

As described in the first embodiment, it can be configured that the edge of the intermediate image IMb on the side of the +x-axis direction can be adjoined to the edge of the intermediate image IMc on the side of the −x-axis direction. In this case, the intermediate image IMb and the intermediate image IMc form a shape of the light distribution pattern D. The intermediate image IMa is formed over the intermediate image IMb and the intermediate image IMc. The light distribution pattern Da forms a high-illumination-intensity region of the light distribution pattern D.

The headlight module 110 includes a light source 1, a condensing optical element 2, and a projecting optical element 3. The light source 1 emits light, which becomes projection light. The condensing optical element 2 collects light emitted from the light source 1 and forms an intermediate image IM with the collected light. A plurality of light sources 1 is included. The projecting optical element 3 magnifies and projects a plurality of intermediate images IMa, IMb, IMc formed by light emitted from the plurality of light sources 1a, 1b, 1c.

The condensing optical element 2 has a function of refracting passing light.

The plurality of intermediate images IMa, IMb, IMc is a single, in which parts corresponding to an edges of light emitting faces 11 of the light sources 1 are joined The headlight module 110 includes an optical-path changing element 4 which changes the traveling direction of light exiting from the condensing optical element 2. The intermediate images IMb, IMc are formed by light the optical path of which has been changed by the optical-path changing elements 4b, 4c.

In the second embodiment, the optical-path changing element 4 is described as a prism, as an example.

The image formed by the plurality of intermediate images IMa, IMb, IMc is formed on a plane perpendicular to the optical axis of the projecting optical element 3.

The optical-path changing elements 4b, 4c have a curved surface which causes the shapes of the intermediate images IMb, IMc to be changed.

The optical-path changing element 4 is a prism in which light exiting from the condensing optical element 2 enters from the incident face 41, and the collected light that entered is reflected by the reflection face 42 and exits from the output face 43.

The incident face 41, the reflection face 42, or the output face 43 of the prism 4 is formed by a curved surface.

The intermediate images IMa, IMb, IMc formed by the respective rays projected from the plurality of light sources 1a, 1b, 1c are arranged continuously.

The plurality of intermediate images IMa, IMb, IMc formed by the respective projected light which is emitted from the plurality of light sources 1a, 1b, 1c become a single image formed by a bright part.

The headlight module 110 forms a high-luminous-intensity region by superimposing one intermediate image IM on another intermediate image IM.

The headlight module 110 includes the control unit 5 which turns on or turns off the light source 1. The headlight module 100 changes the image IM formed by the plurality of intermediate images IMa, IMb, IMc by turning on or turning off the light sources 1a, 1b, 1c.

The intermediate image IM is formed by light reflected by the optical-path changing element 4.

The intermediate image IM is formed by light exiting from the output face 43.

Third Embodiment

In a third embodiment, a headlight apparatus 200 utilizing the headlight modules 100, 110 described in the first and second embodiments will be described.

Figure 8:
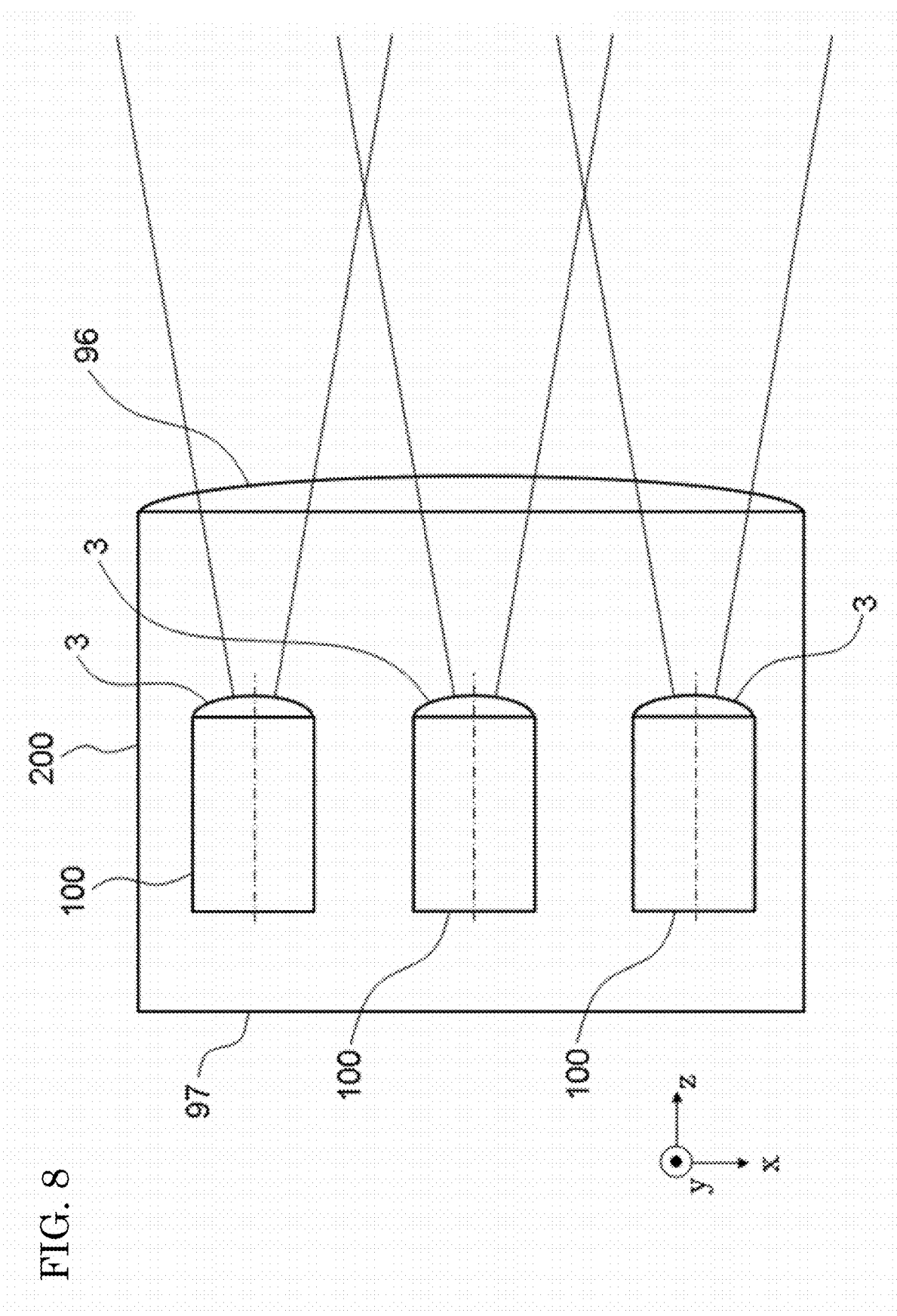
FIG. 8 is a configuration diagram showing a configuration of a headlight module 200 according to a third embodiment.

FIG. 8 is a configuration diagram showing the configuration of the headlight apparatus 200 mounting the headlight modules 100, 110. FIG. 8 shows an example in which the headlight module 100 is mounted. A part or all of the headlight module 100 mounted on the headlight apparatus 200 can be replaced with the headlight module 110.

The headlight module 200 includes a housing 97 and a cover 96.

The housing 97 is disposed inside the vehicle.

The housing 97 holds the headlight module 100 in it. FIG. 8 shows an example in which three headlight modules 100 are held. The number of headlight modules 100 is not limited to three. The number of headlight modules 100 can be one and can be three or more.

The headlight modules 100 are arranged in the x-axis direction inside the housing 97. The arrangement of the headlight modules 100 is not limited to the arrangement in the x-axis direction. The headlight modules 100 can be arranged by shifting in the y-axis direction or in the z-axis direction, in consideration of design, function, and the like.

In FIG. 8, the headlight modules 100 are held inside the housing 97. However, the housing 97 needs not be box-shaped. The housing 97 is configured by a frame or the like, and a configuration in which the headlight modules 100 are fixed to the frame can also be adopted.

The cover 96 is made of a transparent material. The cover 96 is disposed in a surface part of the vehicle body and shows the outside the vehicle body. The cover 96 is disposed in the z-axis direction (front) of the housing 97.

The cover 96 is provided to protect the headlight modules 100 from wind and rain or from dust or the like. However, if the projector lens 3 is structured to protect the parts inside the headlight module 100 from wind and rain or from dust or the like, the cover 96 does not need to be provided.

Light exiting from the headlight module 100 passes through the cover 96 and exits toward the front of the vehicle. In FIG. 8, light exiting from the cover 96 and light exiting from adjacent headlight modules 100 overlap one another to form a single light distribution pattern D.

As described above, if the plurality of headlight modules 100 are included, the headlight apparatus 200 is an aggregate of the headlight modules 100. If a single headlight module 100 is included, the headlight apparatus 200 is equal to the headlight module 100. In other words, the headlight module 100 is the headlight apparatus 200.

The headlight apparatus 200 includes a plurality of headlight modules 100, 110.

In the respective embodiments described above, terms expressing a positional relationship between parts or the shape of a part, such as "parallel" and "perpendicular," are used. These indicate that a range considering manufacturing tolerances and assembly variations is included. Accordingly, if a positional relationship between parts or the shape of a part is indicated in the claims, it means that the range considering manufacturing tolerances, assembly variations, or the like is included.

Although embodiments of the present invention have been described above, the present invention is not limited to those embodiments.

EXPLANATION OF REFERENCE CHARACTERS 100, 110 headlight module, 200 headlight apparatus, 1a, 1b, 1c light source, 10a, 10b, 10c light source unit, 11a, 11b, 11c light emitting face, 2a, 2b, 2c condenser lens, 211a, 212a incident face, 22a reflection face, 231a, 232a output face, 3 projector lens, 4*b*, 4*c* prism, 41*b*, 41*c* incident face, 42*b*, 42*c* reflection face, 43*b*, 43*c* output face, 5 control unit, 51 control signal, 52, 52*a*, 52*b*, 52*c* control signal, 9 illuminated face, 96 cover, 97 housing, IM, IMa, IMb, IMc intermediate image, D, Da, Db, Dc light distribution pattern, xa, IMxa length, m magnification.

What is claimed is:

1. A headlight module comprising:
a plurality of light sources each including a light emitting face placed on a first plane and configured to emit light as projection light;
a plurality of condensing optical elements, each being configured to collect light emitted from one of the plurality of light sources to form collected light, thereby forming a plurality of intermediate mages formed on a second plane that is a conjugate plane of the first plane; and
a projector lens configured to magnify and project the plurality of the intermediate images formed by light emitted from the plurality of light sources; wherein
the plurality of intermediate images are in optically conjugate relationship with the light emitting faces respectively,
the plurality of condensing optical elements has a function of refracting passing light,
each of the condensing optical elements includes an incident face having a point of intersection with an optical axis of one of the condensing optical elements, an output face that is formed on a side of a traveling direction of the light with respect to the incident face and has a point of intersection with the optical axis, and a reflection face formed on an outside of an outer periphery of the incident face,
each of the intermediate images is formed on the second plane by first light which is emitted from one of the light emitting faces, enters one of the condensing optical elements through the incident face, and then exits from the output face, and another image formed on the second plane is smaller than one of the intermediate images and is formed on one of the intermediate images by second light which is emitted from one of the light emitting faces, enters one of the condensing optical elements, and is reflected by the reflection face.

2. A headlight apparatus comprising:
the headlight module according to claim 1.

* * * * *